United States Patent
Aelvoet et al.

(10) Patent No.: US 11,444,441 B2
(45) Date of Patent: Sep. 13, 2022

(54) CLICKABLE CABLE TRAYS

(71) Applicant: Vergokan NV, Oudenaarde (BE)

(72) Inventors: Luc Aelvoet, Oudenaarde (BE); Joseph Servatius van Eeghem, Antwerp (BE); Berten Vandenborre, Oudenaarde (BE); Tony Nieuwenhuysen, Grimbergen (BE)

(73) Assignee: Vergokan NV

( * ) Notice: Subject to any disclaimer, the term of this patent is extended or adjusted under 35 U.S.C. 154(b) by 0 days.

(21) Appl. No.: 16/754,927

(22) PCT Filed: Oct. 10, 2018

(86) PCT No.: PCT/IB2018/001144
§ 371 (c)(1),
(2) Date: Apr. 9, 2020

(87) PCT Pub. No.: WO2019/073293
PCT Pub. Date: Apr. 18, 2019

(65) Prior Publication Data
US 2020/0266614 A1    Aug. 20, 2020

(30) Foreign Application Priority Data

Oct. 10, 2017 (BE) .................................. 2017/5725

(51) Int. Cl.
*H02G 3/04*    (2006.01)
*F16B 7/04*    (2006.01)
*F16L 3/26*    (2006.01)

(52) U.S. Cl.
CPC ......... *H02G 3/0456* (2013.01); *F16B 7/0406* (2013.01); *F16L 3/26* (2013.01)

(58) Field of Classification Search
CPC ...... H02G 3/0456; H02G 3/0462; H02G 3/06; H02G 3/0608; F16B 7/0406
See application file for complete search history.

(56) References Cited

U.S. PATENT DOCUMENTS

| | | | | |
|---|---|---|---|---|
| 3,022,972 A | * | 2/1962 | Bunston | H02G 3/0608 248/68.1 |
| 3,042,351 A | * | 7/1962 | Du Bois | H02G 3/0437 248/49 |
| 3,363,050 A | * | 1/1968 | Martin | H02G 3/045 174/101 |
| 4,246,737 A | * | 1/1981 | Eiloart | B21D 47/01 29/897.31 |

(Continued)

FOREIGN PATENT DOCUMENTS

| | | |
|---|---|---|
| BE | 1020759 A3 | 4/2014 |
| DE | 19841643 A1 | 3/2000 |

(Continued)

OTHER PUBLICATIONS https://www.wiremeshcabletray.org/cable-tray/perforated-cable-tray.html published Sep. 4, 2017.*

(Continued)

*Primary Examiner* — Christopher Garft
(74) *Attorney, Agent, or Firm* — KDB

(57) ABSTRACT

Cable trays which can be pushed inside one another and can be clicked onto one another. Assemblies include cable trays, barbs for cable trays and related methods.

14 Claims, 13 Drawing Sheets

(56) References Cited

U.S. PATENT DOCUMENTS

| | | | | |
|---|---|---|---|---|
| 9,024,188 B2* | 5/2015 | Lacey, Jr | ............... | F16L 3/23 174/68.3 |
| 2014/0103171 A1* | 4/2014 | Sutherland | ............... | H02G 3/32 248/74.3 |
| 2015/0322987 A1* | 11/2015 | Romano | ............... | F16L 3/26 248/49 |

FOREIGN PATENT DOCUMENTS

| | | |
|---|---|---|
| DE | 202008009852 U1 | 9/2008 |
| FR | 2968850 A1 | 6/2012 |
| RU | 2404496 C2 | 11/2010 |
| WO | 2013015755 A2 | 1/2013 |
| WO | 2016205470 A2 | 12/2016 |

OTHER PUBLICATIONS

International Search Report for the International Patent Application No. PCT/IB2018/001144, dated Feb. 21, 2019, 3 pages.
Communication pursuant to Article 94(3) EPC, for Application No. 18801025.0, dated May 14, 2021, 5 pages.

* cited by examiner

CLICKABLE CABLE TRAYS

This is a national stage application filed under 35 U.S.C. § 371 of pending international application PCT/IB2018/001144, filed Oct. 10, 2018, which claims priority to Belgian Patent application BE 2017/5725, filed Oct. 10, 2017, the entirety of which applications are hereby incorporated by reference herein.

TECHNICAL FIELD

The invention relates to cable trays, cable tray components, assemblies comprising cable trays, and related methods.

TECHNOLOGICAL BACKGROUND OF THE INVENTION

Housings for cables in buildings comprise cable trays which are connected to each other. Existing systems provide the connection of adjacent cable trays by means of additional components, such as plates, screws and plug-in systems. Thus, a connection is provided which offers sufficient stability and load bearing capacity.

However, the use of additional components is laborious and not time-efficient: from a logistical point of view, the use of additional components is a drawback, and fitting and removal may also be difficult.

Some existing connecting systems comprise the use of springs, but these systems are not compatible with certain current surface treatments, such as hot-dip galvanizing, which compromises their usefulness. In addition, these connecting systems are more difficult, and consequently more expensive, to produce.

Some of the mentioned systems which comprise additional components are compatible with surface treatments, such as hot-dip galvanizing. But as has already been mentioned, these systems have the drawback that they require additional components, thus making installation more difficult, in particular if the installation is to be carried out by only one person.

There is a therefore a need for cable trays which can easily be connected to one another without the connection losing strength.

There is furthermore a need for connecting mechanisms for cable trays which are useful, irrespective of the surface treatment of the cable trays.

There is furthermore a need for cable trays which can easily be fitted and removed.

There is also a need for cable trays which can be fitted and removed by one single person.

There is furthermore a need for connecting mechanisms for cable trays which can be used regardless of the dimensions of the cable tray.

SUMMARY

The invention and preferred embodiments thereof offer a solution for one or several of the above needs. The present inventors have produced a cable tray which makes it possible to connect adjacent cable trays with sufficient stability and load bearing capacity without the use of additional components, such as bolts or nuts.

In a first aspect, the invention provides an assembly comprising two or more cable trays, each cable tray comprising: a bottom and two upright sides; and a first end extending as a continuation of the bottom and the upright sides and a second end extending as a continuation of the bottom and the upright sides, wherein each side of the first end comprises a barb and each side of the second end comprises a barb opening, wherein each first end and each second end are designed to mate in a sliding manner and to connect in a clickable manner.

A further aspect provides a cable tray comprising: a bottom and two upright sides; and a first end extending as a continuation of the bottom and the upright sides and a second end extending as a continuation of the bottom and the upright sides, wherein the width of the first end is smaller than the width of the second end; and each side of the first end comprises a barb, and each side of the second end comprises a barb opening.

The cable trays as provided herein allow adjacent cable trays to be connected with sufficient stability and load bearing capacity without the use of additional components.

The cable trays as provided herein allow quick fitting of the cable trays, even by one person. The cable trays as provided herein also allow, if necessary, the cable trays to be removed, even by one person. The cable trays as provided herein can be produced in all possible dimensions and surface treatments.

A further aspect provides a barb element comprising a barb and a flat element, the barb comprising an outer side, an inner side and an end, wherein the flat element and the plane of the end form an exterior angle $\alpha$ with each other, and wherein the exterior angle $\alpha$ is smaller than 90°.

A further aspect provides a barb element comprising a barb and a flat element, wherein the edge of the barb and the flat element form an exterior angle $\alpha'$ with each other, and wherein the exterior angle $\alpha'$ is smaller than 90°.

The barbs as provided herein allow form-fitted connections to be made.

A further aspect provides a method for producing a barb element as described herein, comprising the following steps: a) making a cut in a sheet material; and b) deforming the sheet material, thus forming a protrusion on one side of the cut, in which a higher pressure is exerted on the top side of the protrusion compared to the direct surroundings of the top side of the protrusion.

A further aspect provides a method for producing a barb as described herein, comprising the following steps: a) making an arcuate cut in a sheet material; and b) deforming the sheet material, thus forming a protrusion on one side of the cut.

A further aspect provides a method for producing a cable tray as described herein, comprising the following steps: (a') producing barb openings at the second end; (b') producing a cable tray comprising a bottom and two upright sides; (c') forming the first end; and (d') producing a barb on each side of the first end.

DESCRIPTION OF THE FIGURES

The following description of the figures comprises a discussion of specific embodiments of the invention. This is only given as an example and is non-limiting with regard to the subject-matter of the present explanation. In the figures, identical reference numerals refer to the same or similar components or concepts.

FIG. 1 shows, in panel b), a cross section of an assembled assembly (207) according to an embodiment of the present invention comprising a barb (102), according to an embodiment of the present invention.

FIG. 1 shows, in panel c), a cross section of an assembled assembly (208) according to an embodiment of the present invention comprising a barb (103) according to an embodiment of the present invention.

Figure 1:
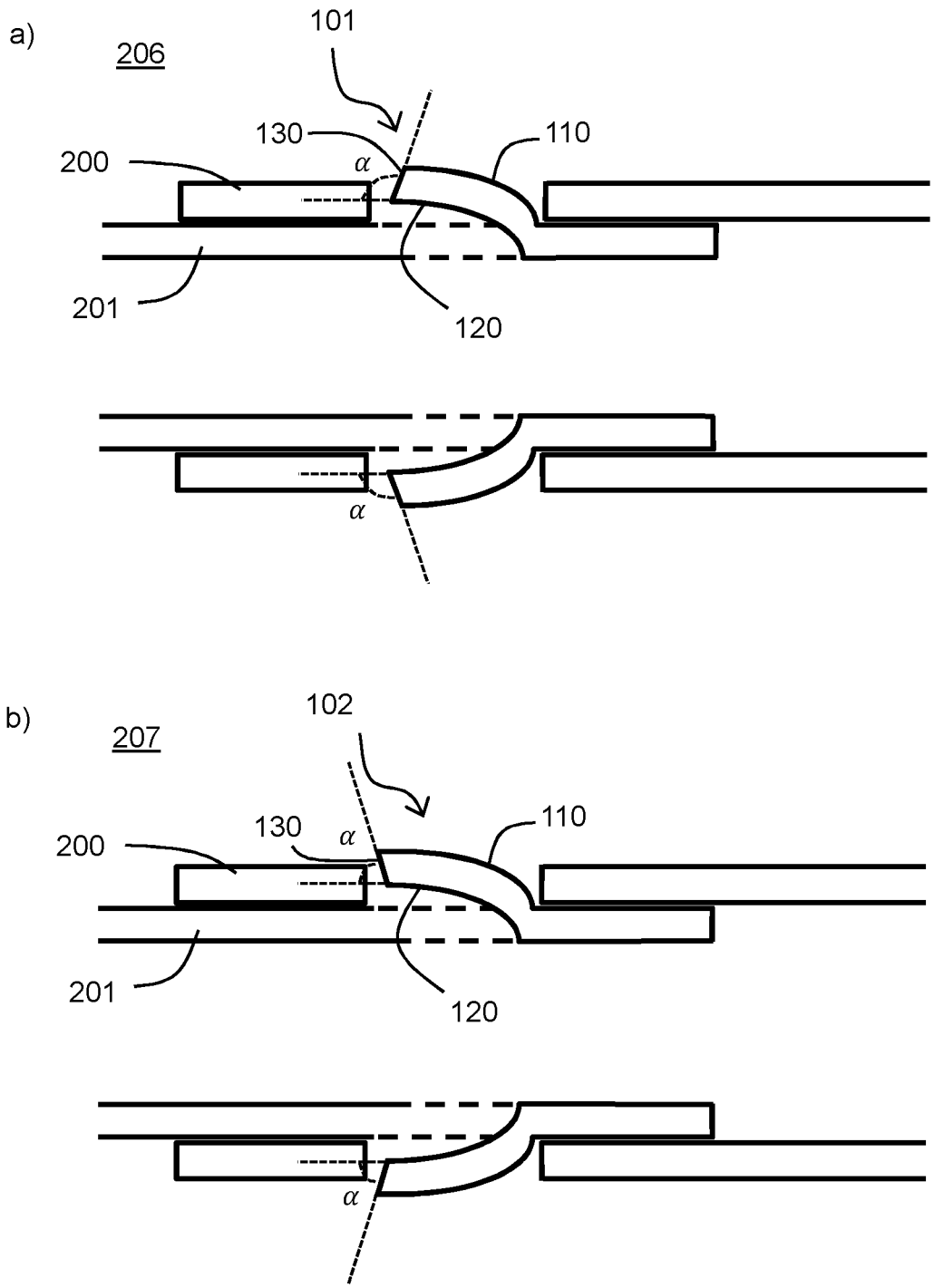
FIG. 1 shows, in panel a), a cross section of an assembled assembly (206) according to an embodiment of the present invention comprising a barb (101).
Figure 1:
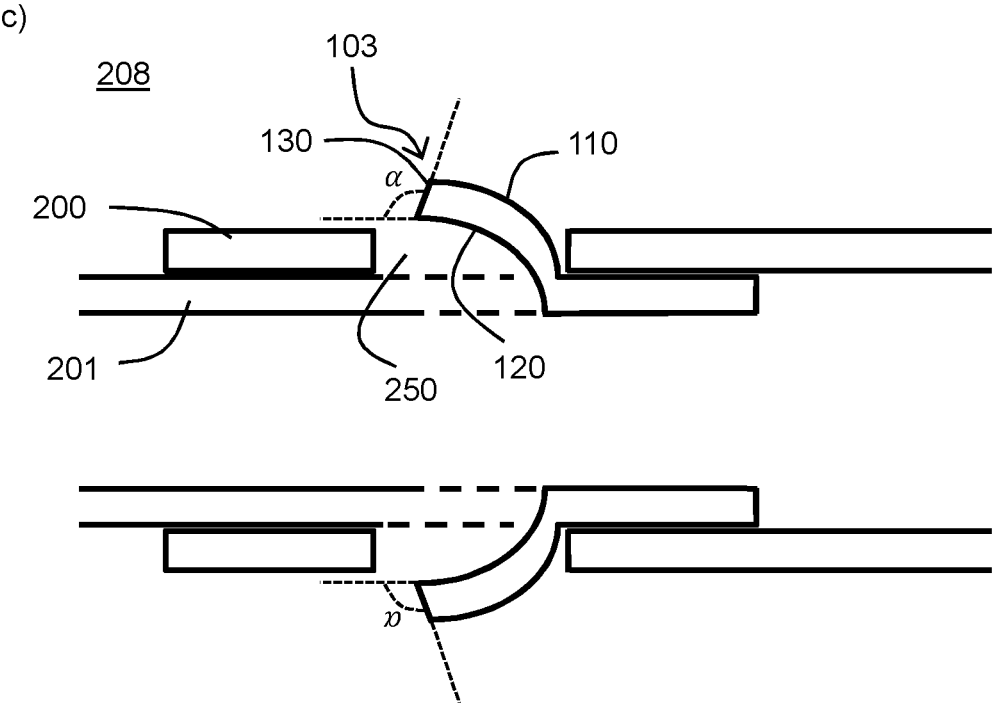

The description and the figures use the following reference numerals: 1—assembly; 10, 11, 206, 207, 208—assembled assembly; 100, 101, 102, 103, 104, 209—barb; 105—opening of barb element; 110—outer side of the barb; 120—inner side of the barb; 130—end of the barb; 140—flattened top side; 141—top side of the barb; 150—lip; 160—cut; 161—arcuate cut; 162—edge; 170, 171—protrusion; 180, 181—base surface; 200, 201—cable tray; 210—first end; 211—fitting openings (in first end); 220—second end; 221—fitting openings (in second end); 230, 231—sides; 240—bottom; 241—fitting openings (in the bottom); 250, 251—barb opening; 260, 261—folding flap; 261, 262—folding flap opening; 263, 270, 271—upper longitudinal edges of second end; 272, 273—upper longitudinal edges of first end; 280—bearing surface; 291, 293—longitudinal perforations; 292—transverse perforations; 300, 301—flat element; 400—cover; 401, 402—releasable clickable connection; 500, 501—barb element; α—exterior angle formed between flat element and the plane of the end of the barb; α'—exterior angle formed between flat element and the edge of the barb; A-A'—longitudinal axis; B—inside; C—outside.

DETAILED DESCRIPTION

As used hereafter in this text, the singular forms "a(n)", "the" comprise both the singular and the plural form unless the context clearly differs.

The terms "comprise", "comprises" as used hereafter, are synonymous with "including", "include" or "contain", "contains" and are inclusive or open and, in addition, do not exclude parts, elements or method steps which have not been mentioned. The terms "comprise", "comprises" include the term "contain".

The enumeration of numeric values by means of ranges of figures comprises all values and fractions in these ranges, as well as the cited end points.

The term "approximately" as used when referring to a measurable value, such as a parameter, an amount, a time period, and the like, is intended to include variations of +/−10% or less, preferably +/−5% or less, more preferably +/−1% or less, and still more preferably +/−0.1% or less, of and from the specified value, insofar as the variations apply in order to function in the disclosed invention. It should be understood that the value to which the term "approximately" refers per se has also been disclosed.

All documents cited in this description are hereby deemed to be incorporated in their entirety by way of reference.

Unless defined otherwise, all terms disclosed in the invention, including technical and scientific terms, have the meaning which a person skilled in the art usually gives them. For further guidance, definitions are included to further explain terms which are used in the description of the invention.

Cable Tray

Thus provided herein is a cable tray, comprising: a bottom and two upright sides; and a first end extending as a continuation of the bottom and the upright sides and a second end extending as a continuation of the bottom and the upright sides, wherein the width of the first end is smaller than the width of the second end; and each side of the first end comprises a barb, and each side of the second end comprises a barb opening. Preferably, the width of the cable tray is equal to the width of the second end over the entire length, except at the first end, where the cable tray is less wide. In other words, the cable tray preferably has a constant width over its entire length, except at the first end; there, the cable tray is narrower. Compared to cable trays whose width is constant except at one end where the cable tray is wider, the cable trays according to this embodiment can be placed closer to a wall. Thus, the cable trays according to the present invention require less installation space.

Preferably, the invention provides a cable tray comprising: a bottom and two upright sides; and a first end extending as a continuation of the bottom and the upright sides and a second end extending as a continuation of the bottom and the upright sides, wherein the width of the cable tray is equal to the width of the second end over the entire length, except at the first end where the cable tray is less wide; and each side of the first end comprises a barb, and each side of the second end comprises a barb opening.

In some embodiments, the first end is 1.0 to 3.0 mm less wide than the rest of the cable tray, or the first end is 2.0 to 4.0 mm less wide than the rest of the cable tray, or the first end is 5.0 to 7.0 mm less wide than the rest of the cable tray, or the first end is 6.0 to 8.0 mm less wide than the rest of the cable tray.

In some embodiments, the first end is 0.5 to 1.5 mm less wide on each side than the rest of the cable tray, or the first end is 1.0 to 2.0 mm less wide on each side than the rest of the cable tray, or the first end is 2.5 to 3.5 mm less wide on each side than the rest of the cable tray, or the first end is 3.0 to 4.0 mm less wide on each side than the rest of the cable tray.

The term "cable tray", as used herein, refers to a channel or trough which is configured to accommodate and support lines from utility companies, such as for example electricity cables or data cables. Cable trays are typically used in a building or other installation, so that the lines can be held securely outside the reach of third parties, for example in the vicinity of the ceiling of the building, so that the lines can be passed safely between starting and end point.

During use, barbs of the first end snap into the barb openings of the second end of an adjacent cable tray. As the second end is wider, the barbs of the first end are provided on the outside of the sides of the cable tray. The inside of the cable tray is the space between its sides. The outside of a cable tray is the space outside its sides.

In some embodiments, the barb openings and/or the barbs are crescent-shaped. Preferably, both the barb openings and the barbs are crescent-shaped. In these embodiments, the barbs are smaller than the corresponding barb openings. In this way, the forces acting on the barb openings during normal use are distributed more evenly across the edge of the barb openings, thus reducing the stresses on the edge of the barb opening.

In addition, the present barbs have the advantage that the forces (on the barb) are absorbed in three directions. In other words, the stresses occurring in the barbs are absorbed (or transmitted) close by the base of the barbs. This prevents the occurrence of peak or structural stresses which could plastically deform the barb when cable tray assemblies are subjected to the full safe working load. Thus, the present barbs as well as the cable trays and assemblies comprising the barbs have the advantage that the forces acting on the barb are transmitted in three directions directly at the base.

Barb openings which are crescent-shaped may, alternatively or additionally, be described as comprising a straight side and an elliptical side. Or, expressed in yet another way, such barb openings have a shape which corresponds to a part of an ellipse between the periphery of the ellipse and a line which runs parallel to the short axis of the ellipse, preferably the smallest part of the ellipse, between the periphery of the ellipse and a line which runs parallel to the short axis of the ellipse.

The crescent-shaped barbs may, alternatively or additionally, also be described as comprising a straight side and an elliptical side. Expressed in other words, such barbs have a shape which corresponds to a part of an ellipse between the periphery of the ellipse and a line which is parallel to the short axis of the ellipse, preferably the smallest part of the ellipse between the periphery of the ellipse and a line which is parallel to the short axis of the ellipse.

Preferably, each side of the first end comprises exactly one barb. In other words, each side of the first end preferably comprises one and only one barb. Expressed in yet another way, the cable tray comprises preferably one and not more than one barb per side at the first end. Preferably, the barbs are placed at the location of the neutral axis of the cable tray.

Preferably, each side of the second end comprises exactly one barb opening.

Preferably, the invention provides a cable tray comprising: a bottom and two upright sides; and a first end extending as a continuation of the bottom and the upright sides and a second end extending as a continuation of the bottom and the upright sides, wherein the width of the cable tray is equal to the width of the second end over the entire length, except at the first end where the cable tray is less wide; and each side of the first end comprises exactly one barb, and each side of the second end comprises exactly one barb opening.

Compared to cable trays comprising barbs in the bottom, the cable trays according to the present invention are able to absorb both positive and negative moments in the longitudinal direction in an efficient manner. Positive moments typically occur in the center between two bearing points. Negative moments typically occur at the location of bearing points. With cable trays which have barbs in the bottom, the coupling of two adjacent cable trays therefore easily bends when the cable trays are supported at the position where a first end and a second end have been clicked together. In practice, this is then solved in a suboptimum manner, for example by not supporting the cable tray at the position where a first and second end have been clicked together, thus necessitating more supports. Alternatively, in such suboptimum systems, two adjacent cable trays are attached to one another using additional bolts, which renders installation significantly more difficult. By contrast, the present cable trays and assemblies can be supported at any desired location and can be clicked together in a simple manner.

Another drawback of providing barbs in the bottom is the fact that the presence of a barb in the bottom involves a significant risk of damage to cables during installation. In the cable trays according to the present invention, the barbs have been provided in the sides, preferably one barb in each side, and in such a way that there is no risk of damage to cables.

In some embodiments, the barb is oriented horizontally. In other words, in these embodiments, the cable trays can be pushed into each other by pushing the first end of a first cable tray over the second end of a second cable tray in the longitudinal direction of these cable trays. Compared to barbs which are oriented vertically, where cable trays are clicked together vertically, cable trays with horizontally oriented barbs require less installation space.

In specific embodiments, the cable tray may be a(n elongate) cable track or a cable-track accessory, such as for example a horizontal (cable) bend, a T piece, a branch piece, a crossing piece, a rising bend or a descending bend. An end piece with a first end as described herein or an end piece with a second end as described herein is also provided herein.

Preferably, the cable trays are elongate, but other shapes are also possible. Thus, the cable trays may, for example, be star-shaped or be formed as a corner. The cable trays may be curved or straight. Preferably, the cable trays are straight. Preferably, the cable trays are elongate.

The cross section of a cable tray as described herein may be rectangular, round or elliptical, or may have a different shape. Preferably, however, the cross section of the cable tray is rectangular. In other words, the cable tray preferably has a U-shaped cross section. An elongate cable tray may thus be considered to have a longitudinal axis (A-A'), an inside (B) and an outside (C).

The cable trays comprise a bottom and two upright sides. Typically, the bottom and the upright sides are made in one piece. Preferably, the entire cable tray is made in one piece.

As an extension of the bottom and the upright sides, the cable tray comprises a first end extending as an extension of the cable tray and a second end extending as an extension of the cable tray. The width of the first end is smaller than the width of the second end.

In particular embodiments, the first end of a cable tray and the second end of a subsequent cable tray are designed to fit into each other in a telescopic manner. In particular embodiments, the first end of a cable tray and the second end of a subsequent cable tray are connectable to each other by clicking. The cable trays as described herein can be installed by one fitter in a very efficient manner. Furthermore, the connection between the two cable trays is strong and can be achieved in a simple manner.

The cable tray comprises one or several barbs, preferably one or several barbs as described herein. At least one side, and preferably each side, of the first end comprises a barb. At least one side, and preferably each side, of the second end comprises a barb opening.

In some embodiments, the cable tray such as described herein comprises two barbs on each side of the first end and two barb openings on each side of the second end. In some embodiments, the barbs and barb openings are placed above one another. This increases the load-bearing capacity of the resulting assembled assembly.

In some embodiments of the cable tray as described herein, the bottom of the first end comprises one or several barbs and the bottom of the second end one or several barb openings. In some embodiments of the cable tray as described herein, the bottom of the second end comprises one or several barbs and the bottom of the first end one or several barb openings. This increases the load-bearing capacity of the resulting assembled assembly.

The barbs of a first cable tray can be clicked into the openings of a second cable tray, so that it is possible to achieve an assembled assembly as provided herein, by means of these cable trays in an efficient manner.

Preferably, the barb is positioned in the longitudinal direction of the cable tray. In other words, preferably the axis of symmetry of the barb is in the longitudinal direction of the cable tray. As a result thereof, the barb makes it possible for two adjacent cable trays to be clicked together to form an assembled assembly in the longitudinal direction and secure them, even when subjected to a high load.

Preferably, the barb is directed towards the outside. Preferably, the barb is situated on the outside of the first end. In some embodiments, the second end slides over the first end. In this case, the barb of the first end may be clicked into the barb opening of the second end.

The term "width", as used herein in the context of a cable tray, refers to the distance between the outermost points of two opposite upright sides.

In some embodiments, the width is equal to the width of the second end over the entire length of the cable tray, except at the first end. In other words, in some embodiments, the cable tray has a constant width over its entire length, except at the first end, where the cable tray is narrower. Such cable trays are easy to produce and can be assembled in an efficient manner.

The term "height", as used herein in the context of a cable tray, refers to the distance between the outermost point of the bottom and the outermost point of the upper longitudinal edge.

In some embodiments, the height of the first end is smaller than the height of the second end. This facilitates assembly of cable trays as provided herein.

In some embodiments, the height is equal to the height of the second end over the entire length of the cable tray, except at the first end. In other words, in some embodiments, the cable tray has a constant height over its entire length, except at the first end, where the height of the cable tray is smaller. Such cable trays can be produced in an easy and efficient manner. This also allows the production of assembled assemblies which have an approximately constant height. Such assembled assemblies can easily be provided with a cover.

In some embodiments, each of the upright sides comprises an inwardly folded upper longitudinal edge or collar. In some embodiments, each of the upright sides comprises a collar which is folded towards the inside. This ensures that the collar of the cable tray does not comprise any sharp edges, thus increasing safety, for example for the fitter during fitting of the cable trays.

In some embodiments, (only) a part of the side of the second end comprises an inwardly folded upper longitudinal edge. In some embodiments, a part of the side of the second end does not comprise an inwardly folded longitudinal edge. In other words, in some embodiments, the inwardly folded upper longitudinal edge comprises a recess. This makes it possible to produce assembled assemblies of an approximately constant height. This helps to prevent an abrupt transition between two cable trays in an assembled assembly.

In some embodiments, the inwardly folded upper longitudinal edge is open towards the underside. This simplifies the construction of the inwardly folded upper longitudinal edge.

In particular embodiments, each of the upright sides comprises an inwardly folded upper longitudinal edge, wherein the inwardly folded upper longitudinal edge of the second end is designed to slidably receive the inwardly folded upper longitudinal edge of the first end of a subsequent cable tray. In some embodiments, the inwardly folded upper longitudinal edge of the second end is open towards the underside. In some embodiments, the inwardly folded upper longitudinal edge of the first end is smaller than the inwardly folded upper longitudinal edge of the second end. Thus, the second end can readily be pushed over the first end.

In some embodiments, the width of the first end is smaller than the width of the second end by at least twice the sheet thickness. In some embodiments, the width of the first end is smaller than the width of the second end by at least 1 mm (i.e., twice the sheet thickness of 0.50 mm), at least 1.5 mm (i.e., twice the sheet thickness of 0.75 mm), at least 2 mm (i.e., twice the sheet thickness of 1 mm), at least 2.5 mm (i.e., twice the sheet thickness of 1.25 mm), or at least 3 mm (i.e., twice the sheet thickness of 1.5 mm). This makes it easier to slide a first end and a second end into each other. This ensures that the assembled assemblies exhibit only small changes in width, if any, at the location of their bearing surface. This makes it easier to place a cover on the assembled assemblies.

In some embodiments, the first end has a width which equals: [the width of the second end−(twice the thickness+ 0.25 mm to 1.50 mm)].

In some embodiments, the width of the first end is approximately (2×the sheet thickness+0.25 mm to 1.50 mm) smaller (i.e. less wide) than the width of the second end. In some embodiments, the width of the first end is approximately 1.25 mm to 4.5 mm smaller than the width of the second end. In some embodiments, the width of the first end is smaller than the width of the second end by approximately 1.25 mm to 2.5 mm (i.e., 2×0.50 mm+0.25 mm to 1.5 mm), approximately 1.75 mm to 3 mm (i.e., 2×0.75 mm+0.25 mm to 1.5 mm), approximately 2.25 mm to 3.5 mm (i.e., 2×1 mm+0.25 mm to 1.5 mm), approximately 2.75 mm to 4 mm (i.e., 2×1.25 mm+0.25 mm to 1.5 mm), or approximately 3.25 mm to 4.5 mm (i.e., 2×1.5 mm+0.25 mm to 1.5 mm). This makes it easier to slide a first end and a second end into each other.

The term "(sheet) thickness", as used herein, refers to the thickness of the sheet material from which the cable tray is made.

The term "sheet material", as used herein, refers to a material formed as a sheet. In particular embodiments of the cable trays, assemblies, barbs or methods as described herein, the sheet material is carbon steel or stainless steel.

The term "sheet" refers generally to a substantially flat object.

The term "bearing surface", as used herein, refers to the part of an assembled assembly where two adjacent cable trays overlap.

In some embodiments, the height of the first end is smaller than the height of the second end by at least twice the sheet thickness. In some embodiments, the height of the first end is smaller than the height of the second end by at least 1 mm (i.e., twice the sheet thickness of 0.50 mm), at least 1.5 mm (i.e., twice the sheet thickness of 0.75 mm), at least 2 mm (i.e., twice the sheet thickness of 1 mm), at least 2.5 mm (i.e., twice the sheet thickness of 1.25 mm), or at least 3 mm (i.e., twice the sheet thickness of 1.5 mm). This makes it easier to slide a first end and a second end into each other. This ensures that the assembled assemblies exhibit only small changes in height, if any, at the location of their bearing surface. This makes it easier to place a cover on the assembled assemblies.

In some embodiments, the first end has a height which equals: [the height of the second end−(twice the sheet thickness+0.25 mm to 1.50 mm)].

In some embodiments, the height of the first end is approximately (2×the sheet thickness+0.25 mm to 1.50 mm) smaller (i.e. less high) than the height of the second end. In some embodiments, the height of the first end is approximately 1.25 mm to 4.5 mm smaller than the height of the second end. In some embodiments, the height of the first end is smaller than the height of the second end by approximately 1.25 mm to 2.5 mm, approximately 1.75 mm to 3 mm, approximately 2.25 mm to 3.5 mm, approximately 2.75 mm to 4 mm or approximately 3.25 mm to 4.5 mm. This makes it easier to slide a first end and a second end into each other.

In some embodiments, the bottom of the first end is raised with respect to the bottom of the rest of the cable tray by at least one time the sheet thickness. In some embodiments, the bottom of the first end is raised by at least 0.50 mm, at least 0.75 mm, at least 1 mm, at least 1.25 mm, or at least 1.50 mm with respect to the bottom of the rest of the cable tray. This makes it easier to slide a first end and a second end into each other.

In some embodiments, the bottom of the first end is raised with respect to the bottom of the cable tray by (one time the sheet thickness+0.25 mm to 1.5 mm). In other words, in some embodiments, the bottom of the first end is raised with respect to the bottom of the rest of the cable tray by (one time the sheet thickness+0.25 mm to 1.5 mm). In some embodiments, the bottom of the first end is raised with respect to the bottom of the rest of the cable tray by approximately 0.75 mm to 3 mm. In some embodiments, the height of the first end is raised with respect to the bottom of the rest of the cable tray by approximately 0.75 mm to 2 mm (i.e., 0.50 mm+0.25 mm to 1.5 mm), approximately 1 mm to 2.25 mm (i.e., 0.75 mm+0.25 mm to 1.5 mm), approximately 1.25 mm to 2.50 mm (i.e., 1 mm+0.25 mm to 1.5 mm), approximately 1.50 mm to 2.75 mm (i.e., 1.25 mm+0.25 mm to 1.5 mm) or approximately 1.75 mm to 3 mm (i.e., 1.5 mm+0.25 mm to 1.5 mm). This makes it easier to slide a first end and a second end into each other.

In some embodiments, the width of the first end is smaller than the width of the second end by at least twice the sheet thickness, the height of the first end is smaller than the height of the second end by at least twice the sheet thickness, and the bottom of the first end is raised with respect to the bottom of the rest of the cable tray by at least one time the sheet thickness. This makes it easier to slide a first end and a second end into each other.

In some embodiments, the sheet thickness is 0.50 mm to 1.50 mm, such as 0.75 mm to 1.50 mm, 1.00 mm to 1.50 mm, or 1.00 mm to 1.25 mm. In some embodiments, the sheet thickness is 0.50 mm to 1.00 mm, such as 0.75 mm to 1.00 mm.

The term "length", as used herein in the context of a cable tray, refers to the distance between two points along the longitudinal axis (A-A') of the cable tray.

In some embodiments, the first end may have a length of 35 mm (3.5 cm) to 100 mm (10 cm). In some embodiments, the first end may have a length of 35 mm to 100 mm, of 40 mm to 90 mm, of 45 mm to 80 mm, of 50 mm to 70 mm or of 40 mm to 60 mm. For example, the first end may have a length of 35 mm, 40 mm, 50 mm, 60 mm, 70 mm, 80 mm, 90 mm or 100 mm.

In some embodiments, the second end may have a length of 35 mm (3.5 cm) to 100 mm (10 cm). In some embodiments, the second end may have a length of 35 mm to 100 mm, of 40 mm to 90 mm, of 45 mm to 80 mm, of 50 mm to 70 mm, or of 40 mm to 60 mm. For example, the second end may have a length of 35 mm, 40 mm, 50 mm, 60 mm, 70 mm, 80 mm, 90 mm or 100 mm.

Preferably, the first end and the second end have the same length. In some embodiments, the first and second end have a length of 35 mm to 100 mm. In some embodiments, the first and second end have a length of 35 mm to 100 mm, of 40 mm to 90 mm, of 45 mm to 80 mm, of 50 mm to 70 mm or of 40 mm to 60 mm. The aforementioned lengths help to achieve a satisfactory load-bearing capacity of the assembled assembly and allow easy assembly of the cable trays.

When forming an assembled assembly by means of two cable trays, a first end and a second end overlap, typically in order to form a bearing surface. The bearing surface helps to achieve a satisfactory load-bearing capacity of the assembled assembly and allow easy assembly of the cable trays.

As was mentioned earlier, the cable tray comprises a barb. In some embodiments, the cable tray comprises a barb as described herein. Such a barb provides a connection between two cable trays which is both form-fitted and force-fitted. This increases the load-bearing capacity of the connection formed by a first end of a cable tray and a second end of a subsequent cable tray.

In some embodiments, the bottom of the cable tray comprises a folding flap, preferably a pre-cut folding flap. In some embodiments, the bottom of the first end comprises a folding flap, preferably a pre-cut folding flap. In some embodiments, the bottom of the cable tray comprises a folding flap opening. In some embodiments, the bottom of the second end comprises a folding flap opening. Once the first and second end have been clicked into place, the folding flap may be folded through the folding flap opening and improves the earthing of the cable tray and/or may ensure an equipotential connection. In some embodiments, the folding flap opening is rectangular or square. In some embodiments, the folding flap is trapezoidal. This further improves the load-bearing capacity and earthing of the cable tray.

In some embodiments, the folding flap is aligned with the transverse direction of the cable tray. In other words, in these embodiments, the folding flap is foldable about an axis which runs parallel to the longitudinal direction of the cable tray. This orientation provides a satisfactory electrical connection between adjacent cable trays in an assembly.

Preferably, the folding flap is aligned with the longitudinal direction of the cable tray. In other words, in these embodiments, the folding flap is foldable about an axis which runs parallel to the transverse direction of the cable tray. This orientation also provides a satisfactory electrical connection between adjacent cable trays in an assembly. In addition, the risk of damage of electricity cables which are placed in the cable tray is minimized. Moreover, a folding flap in the longitudinal direction makes it possible for the folding flap to slide out of the folding flap opening in case of deformation of the cable tray.

The "transverse direction" of the cable tray refers to the direction at right angles to the sides of the cable tray. The "length direction" or "longitudinal direction" of the cable tray runs parallel to the sides of the cable tray and is in line with the cable tray.

In some embodiments, the bottom comprises one or several fitting openings. By means of these openings, cable trays can be assembled in an efficient manner.

In some embodiments, the sides comprise one or several fitting openings. This further facilitates assembling of the cable trays.

In some embodiments, the bottom of the first end and/or the second end comprises one or several fitting openings. In some embodiments, the sides of the first end and/or the second end comprise one or several fitting openings.

In some embodiments, a cable tray as described herein has the subsequent dimensions:
- a width of 75 mm (7.5 cm) to 600 mm (60 cm); for example a width of 75 mm, 100 mm, 150 mm, 200 mm, 250 mm, 300 mm, 350 mm, 400 mm, 450 mm, 500 mm, 550 mm or 600 mm;
- a height of 35 mm (3.5 cm) to 110 mm (11 cm); for example 35 mm, 60 mm, 85 mm, or 110 mm;
- a thickness of 0.50 mm to 1.50 mm; for example 0.50 mm, 0.75 mm, 1.00 mm, 1.25 mm or 1.50 mm; and/or
- a length of 1800 mm (1.80 m) to 6000 mm (6 m); for example 1.8 m, 1.9 m, 2 m, 2.1 m, 2.2 m, 2.3 m, 2.4 m, 2.5 m, 2.6 m, 2.7 m, 2.8 m, 2.9 m, 3 m, 3.1 m, 3.2 m, 3.3 m, 3.4 m, 3.5 m, 3.6 m, 3.7 m, 3.8 m, 3.9 m, 4 m, 4.1 m, 4.2 m, 4.3 m, 4.4 m, 4.5 m, 4.6 m, 4.7 m, 4.8 m, 4.9 m, 5 m, 5.1 m, 5.2 m, 5.3 m, 5.4 m, 5.5 m, 5.6 m, 5.7 m, 5.8 m, 5.9 m or 6 m.

One of the advantages of the present cable trays is the fact that they can be produced in any desired dimension.

The aforementioned widths of the cable tray refer to the width of the second end and of the rest of the cable tray, except for the first end. The aforementioned heights refer to the height of the second end and of the rest of the cable tray, except for first end. The first end is less wide (and optionally less high) than the second end.

In some embodiments, a cable tray as described herein has a width of 75 mm to 150 mm, a height of 35 to 60 mm and a thickness of 0.75 mm to 1.00 mm.

In some embodiments, a cable tray as described herein has a width of 150 mm to 400 mm, a height of 60 mm to 85 mm and a thickness of 1.00 mm to 1.25 mm.

In some embodiments, a cable tray as described herein has a width of 400 mm to 600 mm, a height of 85 mm to 110 mm and a thickness of 1.25 mm to 1.50 mm.

In some embodiments, a cable tray as described herein has a length of 1800 mm to 6000 mm. In some embodiments, a cable tray as described herein has a length of 3000 mm. For example, a cable tray as described herein may have a length of 1.8 m, 1.9 m, 2 m, 2.1 m, 2.2 m, 2.3 m, 2.4 m, 2.5 m, 2.6 m, 2.7 m, 2.8 m, 2.9 m, 3 m, 3.1 m, 3.2 m, 3.3 m, 3.4 m, 3.5 m, 3.6 m, 3.7 m, 3.8 m, 3.9 m, 4 m, 4.1 m, 4.2 m, 4.3 m, 4.4 m, 4.5 m, 4.6 m, 4.7 m, 4.8 m, 4.9 m, 5 m, 5.1 m, 5.2 m, 5.3 m, 5.4 m, 5.5 m, 5.6 m, 5.7 m, 5.8 m, 5.9 m or 6 m.

In some embodiments, a cable tray as described herein has a height, a width, a thickness and a length such as described in Table 1.

TABLE 1

Height, width, thickness and length of cable trays according to different embodiments of the invention

| Embodiment | Height (mm) | Width (mm) | Thickness (mm) | Length (mm) |
|---|---|---|---|---|
| 1 | 35 | 75 | 0.75 | 3000 |
| 2 | 35 | 75 | 1.00 | 3000 |
| 3 | 35 | 100 | 0.75 | 3000 |
| 4 | 35 | 100 | 1.00 | 3000 |
| 5 | 35 | 150 | 0.75 | 3000 |
| 6 | 35 | 150 | 1.00 | 3000 |
| 7 | 35 | 200 | 0.75 | 3000 |
| 8 | 35 | 200 | 1.00 | 3000 |
| 9 | 35 | 300 | 0.75 | 3000 |
| 10 | 35 | 300 | 1.00 | 3000 |
| 11 | 60 | 75 | 0.75 | 3000 |
| 12 | 60 | 75 | 1.00 | 3000 |
| 13 | 60 | 75 | 1.25 | 3000 |
| 14 | 60 | 100 | 0.75 | 3000 |
| 15 | 60 | 100 | 1.00 | 3000 |
| 16 | 60 | 100 | 1.25 | 3000 |
| 17 | 60 | 150 | 0.75 | 3000 |
| 18 | 60 | 150 | 1.00 | 3000 |
| 19 | 60 | 150 | 1.25 | 3000 |
| 20 | 60 | 200 | 0.75 | 3000 |
| 21 | 60 | 200 | 1.00 | 3000 |
| 22 | 60 | 200 | 1.25 | 3000 |
| 23 | 60 | 250 | 0.75 | 3000 |
| 24 | 60 | 250 | 1.00 | 3000 |
| 25 | 60 | 300 | 0.75 | 3000 |
| 26 | 60 | 300 | 1.00 | 3000 |
| 27 | 60 | 300 | 1.25 | 3000 |
| 28 | 60 | 400 | 1.00 | 3000 |
| 29 | 60 | 400 | 1.25 | 3000 |
| 30 | 60 | 500 | 1.00 | 3000 |
| 31 | 60 | 500 | 1.25 | 3000 |
| 32 | 60 | 600 | 1.00 | 3000 |
| 33 | 60 | 600 | 1.25 | 3000 |
| 34 | 85 | 100 | 1.00 | 3000 |
| 35 | 85 | 150 | 1.00 | 3000 |
| 36 | 85 | 200 | 1.00 | 3000 |
| 37 | 85 | 300 | 1.00 | 3000 |
| 38 | 85 | 400 | 1.00 | 3000 |
| 39 | 85 | 400 | 1.50 | 3000 |
| 40 | 85 | 500 | 1.25 | 3000 |
| 41 | 85 | 500 | 1.50 | 3000 |
| 42 | 85 | 600 | 1.25 | 3000 |
| 43 | 85 | 600 | 1.50 | 3000 |
| 44 | 110 | 150 | 1.25 | 3000 |
| 45 | 110 | 200 | 1.25 | 3000 |
| 46 | 110 | 300 | 1.25 | 3000 |
| 47 | 110 | 400 | 1.25 | 3000 |
| 48 | 110 | 500 | 1.25 | 3000 |
| 49 | 110 | 500 | 1.50 | 3000 |
| 50 | 110 | 600 | 1.25 | 3000 |
| 51 | 110 | 600 | 1.50 | 3000 |

One of the advantages of the present cable trays is the fact that they can be made of any of the usual materials and may undergo any of the usual surface treatment.

In some embodiments, the cable tray comprises or consists of carbon steel. Preferably, the cable tray then undergoes a surface treatment. Suitable surface treatments comprise strip-galvanized coating, hot-dip galvanization, powder-coating and plastification. These cable trays are very cost-effective and durable. In some embodiments, the cable tray comprises or consists of corrosion-resistant steel. These cable trays are very durable. Typically, a strip-galvanized coating is applied before production of the cable tray and hot-dip galvanization takes place after production of the cable tray.

The terms "steel" or "carbon steel" refer to an alloy consisting of iron and carbon. Typically, the term steel is used for iron alloys whose content of additives, such as chromium, or carbon content is limited to such an extent (typically less than 1.9%) that they can be hot-formed.

The terms "corrosion-resistant steel" or "stainless steel" refer to an alloy comprising substantially iron, chromium, nickel and carbon. Typically, corrosion-resistant steel contains at least 11% chromium and at most 1.2% carbon.

In some embodiments, the cable tray comprises longitudinal perforations, transverse perforations, or both. This reduces the weight and the consumption of material of the cable tray. These perforations also make convective cooling and/or condensation discharge possible, as well as mechanical connections.

The present cable tray is easy to use in an assembled assembly as described herein and meets the load requirements as defined in standard IEC 61537.

Assembly of Two or More Cable Trays

Furthermore provided herein is an assembly or kit of parts comprising two or more cable trays, each cable tray comprising: a bottom and two upright sides; and a first end extending as a continuation of the bottom and the upright sides and a second end extending as a continuation of the bottom and the upright sides, wherein each side of the first end comprises a barb and each side of the second end comprises a barb opening, wherein each first end and each second end are designed to mate in a sliding manner and to connect in a clickable manner.

Preferably, the invention provides an assembly comprising two or more cable trays, each cable tray comprising: a bottom and two upright sides; and a first end extending as a continuation of the bottom and the upright sides and a second end extending as a continuation of the bottom and the upright sides, wherein the width of each cable tray equals the width of the second end over the entire length, except at the first end where the cable tray is less wide and wherein each side of the first end comprises a barb and each side of the second end comprises a barb opening, wherein each first end and each second end are designed to mate in a sliding manner and to connect in a clickable manner.

In particular embodiments of the assembly or kit of parts, each side of the first end comprises exactly one barb. In particular embodiments of the assembly or kit of parts, each side of the first end comprises exactly one barb opening. Preferably, the invention thus provides an assembly comprising two or more cable trays, each cable tray comprising: a bottom and two upright sides; and a first end extending as a continuation of the bottom and the upright sides and a second end extending as a continuation of the bottom and the upright sides, wherein the width of each cable tray equals the width of the second end over the entire length, except at the first end where the cable tray is less wide and wherein each side of the first end comprises exactly one barb and each side of the second end comprises exactly one barb opening, wherein each first end and each second end are designed to mate in a sliding manner and to connect in a clickable manner.

In particular embodiments of the assembly or kit of parts, each first end is designed to overlap with a second end of a subsequent cable tray; each second end is designed to slidably receive a first end of a subsequent cable tray; each barb is designed to be clickable into a barb opening of a subsequent cable tray; and/or each barb opening is designed to slidably receive a barb of a subsequent cable tray.

In particular embodiments, the outside of the first end overlaps the inside of the second end. In such embodiments, the barb is on the outside of the first end. In particular embodiments, the inside of the first end overlaps the outside of the second end. In such embodiments, the barb is on the outside of the first end. Preferably, the outside of the first end overlaps the inside of the second end.

In particular embodiments of the assembly or kit of parts, each of the upright sides comprises an inwardly folded upper longitudinal edge, wherein the inwardly folded upper longitudinal edge of the second end is provided to slidably receive the inwardly folded upper longitudinal edge of the first end of a subsequent cable tray.

In particular embodiments, the assembly or kit of parts comprises two or more cable trays as described herein, for example three, four, five, six, seven, eight, nine, ten, eleven, twelve, thirteen, fourteen, fifteen or more cable trays as described herein. The cable trays may all have the same shape or the cable trays may have a different shape. For example, the assembly or kit of parts comprises two or more (elongate) cable tracks. More for example, the assembly or kit of parts comprises one or more (elongate) cable tracks and one or more cable-track accessories, such as for example horizontal (cable) bends, T pieces, branch pieces, crossing pieces, rising bends, descending bends or end pieces. The cable trays may all have the same length or the cable trays may have a different length.

In some embodiments, the assembly comprises a cover. The cover is typically placed on the upper longitudinal edges of the cable trays. Thus, it is possible to produce a closed assembled assembly in an efficient manner.

In some embodiments, the cover is designed to be clicked onto a cable tray. Preferably, the cover comprises one or several releasable clickable connections, also known as louvre connections. In some embodiments, the releasable clickable connections may click onto an assembled assembly. In some embodiments, the sides of the cable trays comprise longitudinal perforations into which the releasable clickable connections can be clicked. The releasable clickable connections make it possible to attach the cover to an assembled assembly in an easy manner. In addition, the releasable clickable connections make it possible to remove the cover from an assembled assembly in a simple manner, should this be required (for example in case of checks or repairs).

In particular embodiments of the assembly or kit of parts, the cable trays as described herein may be pushed inside one another. In particular embodiments of the assembly or kit of parts, the cable trays as described herein may be pushed inside each other and be connected to one another in a clickable manner by means of one or several barbs, preferably one barb, on each side of the first end. In particular embodiments, the cable trays as described herein may furthermore be connected to one another in a clickable manner by means of one or several barbs in the bottom of the first end. Thus, an assembled assembly is provided in which the barb is accessible via the outside of the cable trays. Thus, the barb is readily accessible and the assembled assembly can easily be disassembled, if required. Typically, disassembling an assembled assembly comprises bending the barb opening outwards, for example using an elongate tool such as an open-end wrench or open-end spanner. As a result thereof, the barb opening of the second end can be bent so far away from the barb that the barb becomes detached and the first and second end can be disengaged.

In some embodiments, and in particular when the assembly is assembled, the first end of a cable tray and the second end of a subsequent cable tray are slid over one another. In this way, a bearing surface is formed. Furthermore, the barbs are clicked into the barb openings of the subsequent cable tray.

In some embodiments, the bearing surface has a length of 35 mm to 100 mm. In some embodiments, the bearing surface may have a length of 40 mm to 90 mm, of 45 mm to 80 mm, of 50 mm to 70 mm or of 40 mm to 60 mm. In some embodiments, the bearing surface may have a length of 50 mm. In this way, a strong connection which is nevertheless easy to accomplish can be formed between the cable trays.

Barb

Provided herein is a barb element comprising a barb and flat element, the barb comprising an outer side, an inner side and an end, wherein the flat element and the plane of the end form an exterior angle $\alpha$ with each other and wherein the exterior angle $\alpha$ is smaller than 90°. The angle $\alpha$ or exterior angle $\alpha$ is as shown in FIG. 1. As a result thereof, the barb will provide a form-fitted connection.

The "end" as described herein refers to the edge at the top side of the barb. There, the barb may be flattened and a lip may form.

The terms "top side" and "the upper part" may be used interchangeably here.

In particular embodiments, the surface area of the top side of the barb is approximately $\frac{1}{20}$ to approximately $\frac{1}{4}$ of the surface area of the barb. For example, the surface area of the top side of the barb is approximately $\frac{1}{15}$ to approximately $\frac{1}{6}$ of the surface area of the barb. For example, the surface area of the top side of the barb is approximately $\frac{1}{10}$ to approximately $\frac{1}{8}$ of the surface area of the barb.

Also provided herein is a barb element comprising a barb and a flat element, wherein the edge of the barb and the flat element form an exterior angle $\alpha'$ with each other and wherein the exterior angle $\alpha'$ is smaller than 90°. The angle $\alpha'$ or exterior angle $\alpha'$ is as shown in FIG. 2B. As a result thereof, the barb will provide a form-fitted connection.

Also provided herein is a barb element comprising a barb and flat element, the barb comprising an outer side, an inner side and an end, wherein the flat element and the plane of the end preferably form an exterior angle $\alpha$ with each other and wherein the exterior angle $\alpha$ is smaller than 90°, and wherein the edge of the barb and the flat element form an exterior angle $\alpha'$ with each other, and wherein the exterior angle $\alpha'$ is smaller than 90°.

In some embodiments, the barb is made from a flat element consisting of a sheet material, such as for example carbon steel or stainless steel.

In some embodiments, the flat element forms part of the cable tray in which the barb is provided. In some embodiments, the flat element is the side of a cable tray. In some embodiments, the flat element is the bottom of a cable tray.

In some embodiments, the barb for a cable tray comprises an outer side, an inner side and an end, wherein the longitudinal axis of the cable tray (or longitudinal direction of the cable tray) and the plane of the end form an exterior angle $\alpha$ with each other, and wherein the exterior angle $\alpha$ is smaller than 90°. In other words, in some embodiments, the barb for a cable tray comprises an outer side, an inner side and an end, wherein the flat of the side of the cable tray and the plane of the end form an exterior angle $\alpha$ with each other, and wherein the exterior angle $\alpha$ is smaller than 90°. As a result thereof, the barb will provide a form-fitted connection, so that the cable trays do not become detached when subjected to (heavy) load.

In some embodiment, the barb comprises a flattened top side. This increases the load-bearing capacity of the connection between two cable trays.

In some embodiments, the barb comprises a lip. The lip is a projecting part at the top side of the barb. The lip ensures interlocking. This increases the load-bearing capacity of the connection between two cable trays. This barb makes it possible to produce strong and readily achievable connections between two cable trays.

In some embodiments, the edge of the barb and the longitudinal axis of the cable tray (or longitudinal direction of the cable tray) form an exterior angle $\alpha'$ with each other and the exterior angle $\alpha'$ is smaller than 90°. In other words, in some embodiments, the edge of the barb and the plane of the side of the cable tray form an exterior angle $\alpha'$ with each other and the exterior angle $\alpha'$ is smaller than 90°. This ensures a form-fitted assembled assembly of cable trays so that the cable trays do not become detached when subjected to (heavy) load.

In some embodiments, the barb for a cable tray comprises an outer side, an inner side and an end, wherein the inner side of the barb projects from the barb opening. In other words, the inner side of the barb projects further than the side of the second end. In some embodiments, the barb for a cable tray comprises an outer side, an inner side and an end, wherein the longitudinal axis of the cable tray and the plane of the end form an exterior angle $\alpha$ with each other and wherein the exterior angle $\alpha$ is smaller than 90°, and wherein the inner side of the barb projects from the barb opening. This ensures that an assembled assembly of cable trays is form-fitted.

In some embodiments, the barb comprises a lip, an outer side, an inner side and an end, wherein the inner side of the barb projects from the barb opening. This ensures that an assembled assembly of cable trays is form-fitted.

In some embodiments, the barb has a base which is shaped as a hemiellipse or semicircle. Such barbs can easily be made from a flat element such as a sheet material.

In some embodiments, the barb has a base which is formed as a hemiellipse, semicircle, rounded square or rounded rectangle. Such barbs can easily be made from a flat element such as a sheet material. Such barbs are also compatible with all existing current surface treatments, including hot-dip galvanization, which is not the case with existing barbs. In addition, the present barbs have the advantage that the forces (on the barb) are absorbed in three directions. In other words, the stresses which occur in the barbs are absorbed close to the bases of the barbs (or transmitted).

This prevents the occurrence of peak or structural stresses which could plastically deform the barb if assemblies of cable trays are subjected to the full safe working load. Thus, the present barbs, as well as cable trays and assemblies which comprise the barbs, have the advantage that the forces acting on the barb are transmitted in three directions directly at the base.

In some embodiments, the barb consists of carbon steel. In some embodiments, the barb then has undergone a surface treatment. Suitable surface treatments comprise strip-galvanized coating, hot-dip galvanization, powder-coating and plastification. Such barbs are very cost-efficient and durable, and make it possible to produce connections having a high load-bearing capacity. In some embodiments, the barb consists of stainless steel. These barbs are very durable and make it possible to produce connections having a high load-bearing capacity.

Methods

Furthermore provided herein is a method for producing a barb as provided herein. The method comprises the following steps:
a) making a cut in a sheet material; and
b) deforming the sheet material, thus forming a protrusion on one side of the cut, wherein a higher pressure is exerted on the top side of the protrusion compared to the immediate surroundings of the top side of the protrusion.

In some embodiments, the cut is a linear cut. In some embodiments, the cut is an arcuate cut.

In some embodiments, the cut is at right angles to the longitudinal direction of the cable tray. In some embodiments, the axis of symmetry of the barb runs in the longitudinal direction of the cable tray.

Preferably, step b) is performed in one stroke. This is an efficient, reliable and cost-efficient manner of producing a barb as provided herein.

Also provided herein is a method for producing a barb as provided herein. The method comprises the following steps:
a) making an arcuate cut in a sheet material; and
b) deforming the sheet material, thus forming a protrusion on one side of the cut. Such a method results in a barb in which the inner side of the barb projects from the barb opening when two cable trays are assembled.

Furthermore provided herein is a method for producing a cable tray comprising the following steps:
(a') providing barb openings at the second end (where the sides will be formed);
(b') producing a cable tray comprising a bottom and two upright sides;
(c') forming the first end; and
(d') providing a barb on each side of the first end.

In some embodiments, steps (c') and (d') are performed successively. In some embodiments, steps (c') and (d') are performed simultaneously.

Preferably, the barb is provided in the sides of the cable tray by means of a method for producing a barb such as provided herein.

In some embodiments, forming the first end is brought about by means of a flying die. The term "flying die" refers to a die which moves along with a workpiece in a production line. Thus, a cable tray as provided herein can be produced in an efficient manner.

In particular embodiments, the method for producing a cable tray comprises the step of providing barb openings at the second end (where the bottom will be formed). In particular embodiments the method for producing of a cable tray comprises the step (e') of producing a barb in the bottom of the first end. In some embodiments, steps (c'), (d') and (e') are performed successively. In some embodiments, steps (c'), (d') and (e') are performed simultaneously, for example by a flying die. Thus, a cable tray as provided herein can be produced in a very efficient manner.

In particular embodiments, the method for producing a cable tray comprises the step of producing barb openings at the first end (where the bottom will be formed). In particular embodiments, the method for producing a cable tray comprises the step of producing a barb in the bottom of the second end.

Furthermore provided herein is a method for connecting or assembling two or more cable trays as described herein. The method comprises the following steps: pushing a cable tray and a subsequent cable tray into one another and clicking the barbs of the cable tray in the barb openings of the subsequent cable tray. An assembly as described herein can thus be assembled in an efficient manner.

Furthermore provided herein is a method for disassembling two or more cable trays as described herein. The method comprises the following step: bending the barb opening of the second end outwards by means of an elongate tool, for example an open-end wrench or an open-end spanner. By bending the barb opening outwards, the barb becomes detached and the first end and the second end can be disengaged. An assembled assembly can thus be disassembled in an efficient manner.

The present invention will be explained further below by means of the following specific embodiments.

Specific Embodiment 1

An assembly comprising two or more cable trays, with at least one of the two or several cable trays typically, but not necessarily, being elongate, each cable tray comprising:
a bottom and two upright sides, the bottom and two upright sides preferably being made in one piece; and
a first end extending as a continuation of the bottom and the upright sides and a second end extending as a continuation of the bottom and the upright sides,
wherein each side of the first end comprises a barb and each side of the second end comprises a barb opening, wherein each first end and each second end are designed to mate in a sliding manner and to connect in a clickable manner.

Specific Embodiment 2

The assembly according to specific embodiment 1, wherein each first end is designed to overlap with a second end of a subsequent cable tray; each second end is designed to slidably receive a first end of a subsequent cable tray; each barb is designed to be clicked into a barb opening of a subsequent cable tray; and each barb opening is designed to slidably receive a barb of a subsequent cable tray.

Specific Embodiment 3

The assembly according to specific embodiment 1 or 2, wherein each of the upright sides comprises an inwardly folded upper longitudinal edge, wherein the inwardly folded upper longitudinal edge of the second end is provided to slidably receive the inwardly folded upper longitudinal edge of the first end of a subsequent cable tray.

Specific Embodiment 4

A cable tray comprising:
a bottom and two upright sides, the bottom and two upright sides preferably being made in one piece; and
a first end extending as a continuation of the bottom and the upright sides and a second end extending as a continuation of the bottom and the upright sides, wherein the width of the first end is smaller than the width of the second end; and each side of the first end comprises a barb, and each side of the second end comprises an opening.

Specific Embodiment 5

The cable tray according to specific embodiment 4, wherein the width is equal to the width of the second end over the entire length of the cable tray, except at the first end.

Specific Embodiment 6

The cable tray according to specific embodiment 4 or 5, wherein the height of the first end is smaller than the height of the second end.

Specific Embodiment 7

The cable tray according to any of the specific embodiments 4 to 6, wherein the height is equal to the height of the second end over the entire length of the cable tray, except at the first end.

Specific Embodiment 8

The cable tray according to any of the specific embodiments 4 to 7, wherein each of the upright sides comprises an inwardly folded upper longitudinal edge.

Specific Embodiment 9

The cable tray according to any of the specific embodiments 4 to 8, wherein a part of the side of the second end comprises an inwardly folded upper longitudinal edge.

Specific Embodiment 10

The cable tray according to any of the specific embodiments 4 to 9, wherein the inwardly folded upper longitudinal edge is open towards the underside and wherein the inwardly folded upper longitudinal edge of the first end is smaller than the inwardly folded upper longitudinal edge of the second end.

Specific Embodiment 11

The cable tray according to any of the specific embodiments 4 to 10, wherein the bottom and the upright sides are made in one piece.

Specific Embodiment 12

The cable tray according to any of the specific embodiments 4 to 11, wherein the width of the first end is smaller than the width of the second end by at least twice the sheet thickness.

Specific Embodiment 13

The cable tray according to any of the specific embodiments 4 to 12, wherein the height of the first end is smaller than the height of the second end by at least twice the sheet thickness.

Specific Embodiment 14

The cable tray according to any of the specific embodiments 4 to 13, wherein the bottom of the first end is raised with respect to the bottom of the (rest of the) cable tray by at least one time the sheet thickness.

Specific Embodiment 15

The cable tray according to any of the specific embodiments 4 to 14, wherein the first and second end have a length of 35 mm to 100 mm.

Specific Embodiment 16

The cable tray according to any of the specific embodiments 4 to 15, wherein the barb comprises an outer side, an inner side and an end, wherein the longitudinal axis of the cable tray and the plane of the end form an (exterior) angle $\alpha$ with each other and wherein the (exterior) angle $\alpha$ is smaller than 90°.

Specific Embodiment 17

The cable tray according to any of the specific embodiments 4 to 16, wherein the barb comprises an outer side, an inner side and an end, wherein the inner side of the barb projects from the barb opening.

Specific Embodiment 18

The cable tray according to any of the specific embodiments 4 to 17, wherein the barb comprises a flattened top side.

Specific Embodiment 19

The cable tray according to any of the specific embodiments 4 to 18, wherein the barb comprises a lip.

Specific Embodiment 20

The cable tray according to any of the specific embodiments 4 to 19, wherein the barb has a base which is formed as a hemiellipse.

Specific Embodiment 21

The cable tray according to any of the specific embodiments 4 to 20, wherein the bottom of the cable tray comprises a folding flap, preferably comprises a pre-cut folding flap.

Specific Embodiment 22

The cable tray according to specific embodiment 21, wherein the folding flap is trapezoidal.

Specific Embodiment 23

The cable tray according to any of the specific embodiments 4 to 22, wherein the bottom of the first end comprises one or several barbs and the bottom of the second end comprises one or several barb openings; wherein the bottom of the second end comprises one or several barbs and the bottom of the first end comprises one or several barb openings; and/or wherein the bottom of the first end and/or the second end comprises one or several fitting openings.

Specific Embodiment 24

The cable tray according to any of the specific embodiments 4 to 23, wherein the sides of the first end and/or the second end comprises one or several fitting openings.

Specific Embodiment 25

The cable tray according to any of the specific embodiments 4 to 24, having:
a width of 75 mm to 600 mm;
a height of 35 mm to 110 mm;
a thickness of 0.50 mm to 1.50 mm; and/or
a length of 1800 mm to 6000 mm.

Specific Embodiment 26

The cable tray according to any of the specific embodiments 4 to 25, consisting of carbon steel and optionally having undergone a surface treatment selected from the list consisting of strip-galvanized coating, dip galvanization, powder-coating or plastification; and/or consisting of corrosion-resistant steel.

Specific Embodiment 27

The cable tray according to any of the specific embodiments 4 to 26, wherein the cable tray comprises longitudinal perforations, transverse perforations or both.

Specific Embodiment 28

The assembly according to any of the specific embodiments 1 to 3, comprising two or more cable trays as defined in any of the specific embodiments 4 to 27.

Specific Embodiment 29

The assembly according to any of the specific embodiments 1 to 3, or 28, further comprising a cover.

Specific Embodiment 30

The assembly according to any of the specific embodiments 1 to 3, or 28, or 29, wherein the cover is designed to be clicked onto a cable tray, preferably wherein the cover comprises one or several releasable clickable connections.

Specific Embodiment 31

The assembly according to any of the specific embodiments 1 to 3, 28 to 30, wherein the first end of a cable tray and the second end of a subsequent cable tray are slid over one another and wherein the barbs of the cable tray are clicked into the barb openings of the subsequent cable tray.

Specific Embodiment 32

The assembly according to specific embodiment 31, wherein the length of the bearing surface is 35 mm to 100 mm.

Specific Embodiment 33

A barb element comprising a barb and a flat element, the barb comprising an outer side, an inner side and an end, wherein the flat element and the plane of the end form an (exterior) angle α with each other, and wherein the (exterior) angle α is smaller than 90°.

Specific Embodiment 34

A barb element comprising a barb and a flat element, wherein the edge of the barb and the flat element form an (exterior) angle α' with each other, and wherein the (exterior) angle α' is smaller than 90°.

Specific Embodiment 35

The barb according to specific embodiment 33 or 34, the base of which describes a hemiellipsee.

Specific Embodiment 36

The barb according to any of the specific embodiments 33 to 35, which comprises a flattened top side.

Specific Embodiment 37

The barb according to any of the specific embodiments 33 to 36, which comprises a lip.

Specific Embodiment 38

A method for producing a barb according to any of the specific embodiments 33, or 35 to 37, comprising the steps:
a) making a cut in a sheet material; and
b) deforming the sheet material, thus forming a protrusion on one side of the cut, wherein a higher pressure is exerted on the upper part of the protrusion compared to the immediate surroundings of the upper part of the protrusion; for example wherein the cut is a linear cut or wherein the cut is an arcuate cut.

Specific Embodiment 39

The method according to specific embodiment 38, wherein step b) is performed in one stroke.

Specific Embodiment 40

A method for producing a barb according to any of the specific embodiments 34 to 37, comprising the following steps:
a) making an arcuate cut in a sheet material; and
b) deforming the sheet material, thus forming a protrusion on one side of the cut.

Specific Embodiment 41

A method for producing a cable tray according to any of the specific embodiments 4 to 27, comprising the following steps:
(a') providing barb openings at the second end (where the sides will be formed);

(b') producing a cable tray comprising a bottom and two upright sides;
(c') forming the first end; and
(d') providing a barb on each side of the first end.

Specific Embodiment 42

The method according to specific embodiment 41, wherein the barb is produced by means of a method according to any of the specific embodiments 38 to 40.

Specific Embodiment 43

The method according to specific embodiment 41 or 42, wherein forming the first end is brought about by means of a flying die.

Specific Embodiment 44

A method for assembling an assembly according to any of the specific embodiments 28 to 32, comprising the following step: pushing a cable tray and a subsequent cable tray into one another and clicking the barbs of the cable tray into the barb openings of the subsequent cable tray.

Specific Embodiment 45

A method for disassembling an assembly according to any of the specific embodiments 28 to 32, comprising the following step: bending the barb opening of the second end outwards by means of a elongate tool, for example an open-end wrench or an open-end spanner.

EXAMPLES

Example 1

In a first example, reference is made to FIG. 1. FIG. 1 shows three panels which each show a longitudinal cross section of the sides of the cable trays (200, 201) in an assembled assembly (206, 207, 208). The cross section is made at the location of the top side (141) of the barb. In panel a, b and c, a barb (101, 102, 103) is shown. The barb (101, 102, 103) comprises an outer side (110), an inner side (120), and an end (130). In panel a, the end (130) forms an angle α with the longitudinal axis of the cable tray (120) which is greater than 90°. A barb (101) as shown in panel a may be achieved by means of a prior-art method for producing a barb.

In panel b, the end (130) forms an angle α with the longitudinal axis of the cable tray (120) which is smaller than 90°. Such a barb (102) as shown in panel b provides a connection between two cable trays which is form-fitted. The barb (102) shown in panel b can be produced by means of a method according to an embodiment of the present invention as described in Example 2. The barb (102) shown in panel b has the advantage that this barb according to an embodiment of the invention, and thus also a cable tray comprising a barb according to this embodiment of the invention, makes a higher load-bearing capacity possible or, in other words, has a higher load bearing capacity or Safe Working Load (SWL) according to IEC61537.

In panel c, the inner side (120) of the barb projects from the barb opening (250). In other words, the inner side (120) of the barb projects further than the side of the second end. This ensures that the assembled assembly (208) is form-fitted. The angle α formed between the end (130) and the longitudinal axis of the cable tray (120) may be larger than 90° (as is shown in panel c) or may be smaller than 90°. A barb (103), the inside (120) of which barb projects from the barb opening (250), may be produced by means of a method according to an embodiment of the present invention as described in Example 3. The barb (103) shown in panel c has the advantage that this barb according to an embodiment of the invention, and so also a cable tray comprising a barb according to this embodiment of the invention, makes a higher load-bearing capacity possible or, in other words, has a higher load bearing capacity or Safe Working Load (SWL) according to IEC61537.

Example 2

Figure 2A:
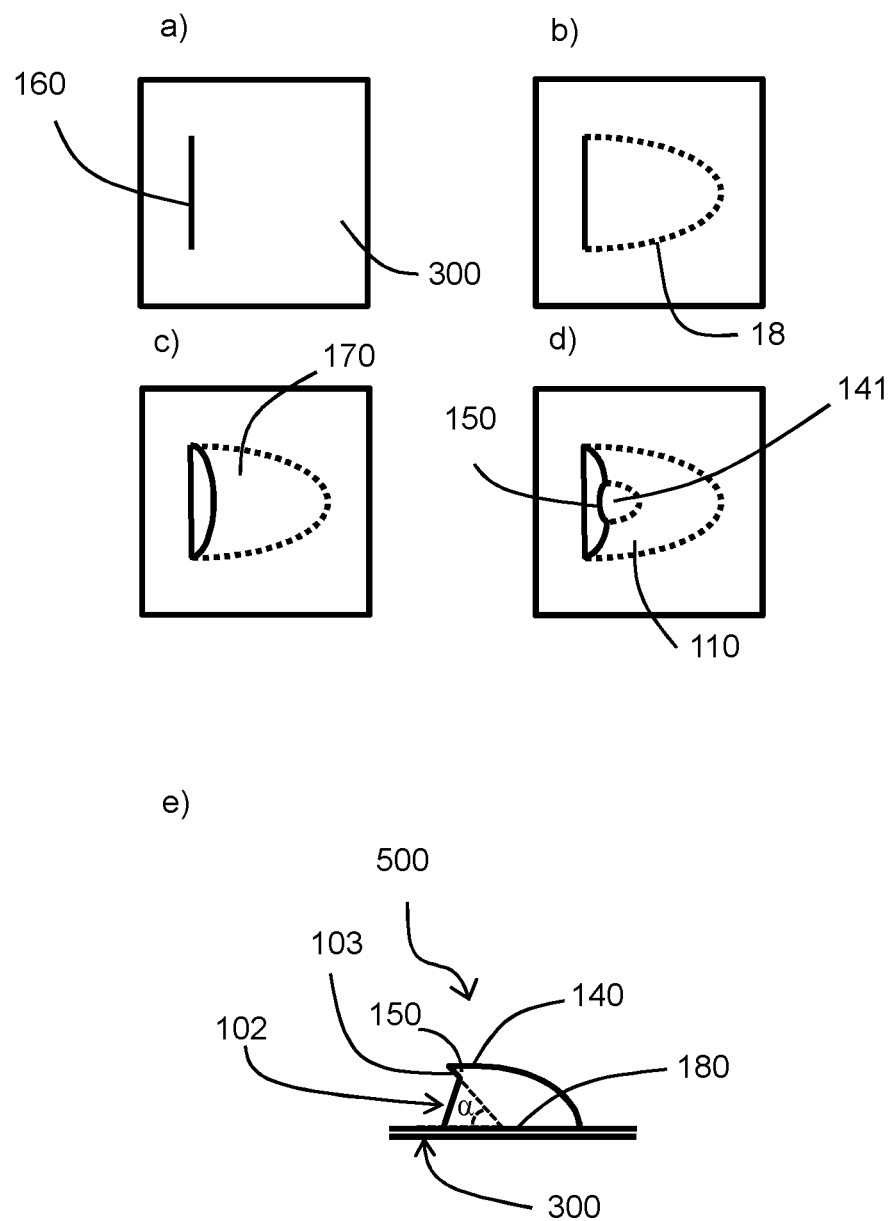
FIG. 2A shows, in panels a)-d), a plan view of intermediate steps of a production process according to a first embodiment of the present invention for producing a barb element and, in panel e), a side view of a barb element (500) according to an embodiment of the present invention.
Figure 2B:
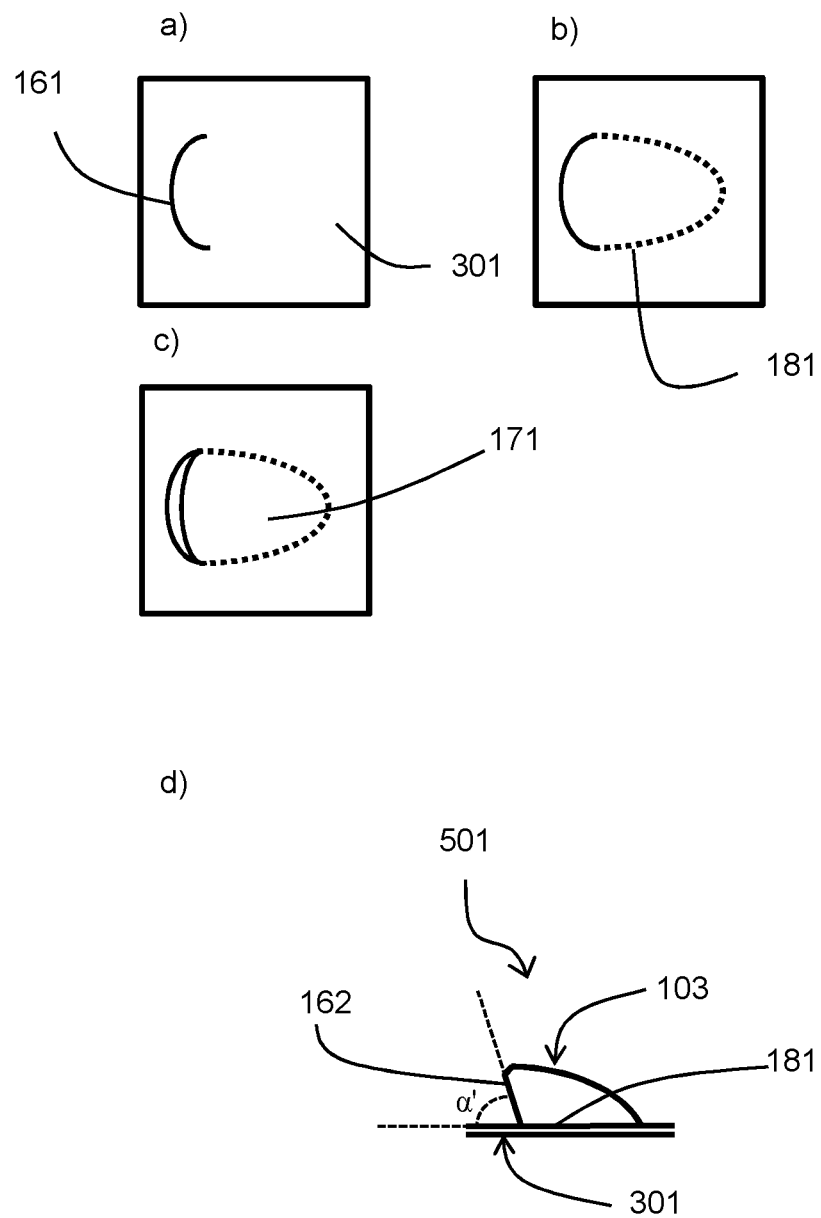
FIG. 2B shows, in panels a)-c), a plan view of intermediate steps of a production process according to a second embodiment of the present invention for producing a barb element and, in panel d), a side view of a barb element (501) according to an embodiment of the present invention.

In a further example, reference is made to FIG. 2A. FIG. 2A comprises five panels a to e. Panels a to d show a plan view of a method according to an embodiment of the invention for producing a barb (102). Panel e shows a side view of a barb (102) according to an embodiment of the invention.

In particular, the forming process of the barb (102) is shown in steps in panels a to d. Panel a shows how a cut (160) is made in a flat element (300), for example a steel or stainless steel sheet. This cut may be linear, as is shown in panel a. However, this cut may also be arcuate. Panels b and c show how a protrusion (170) is formed on one side of the cut (160) by exerting pressure on the flat element (300). The base (180) of the protrusion (170) preferably describes a hemiellipse. Panel d shows how a flattened top side (140) of the barb (102) is formed by exerting additional pressure on the top side (141) of the outside (110) of the barb (102). The steps which are shown in panels b to d may be performed in one stroke.

The process according to panels a to d results in a barb element (500) according to an embodiment of the invention as shown in panel e, comprising a barb (102) and a flat element (300). The barb (102) is formed from a sheet material, such as steel or stainless steel. The barb (102) comprises a flattened top side (140) and a lip (150). The angle or exterior angle α formed between the flat element (300) and the plane of the end (130) is smaller than 90°. As a result thereof, the barb will provide a form-fitted connection.

Example 3

In a further example, reference is made to FIG. 2B. FIG. 2B comprises four panels a to d. Panels a to c show a plan view of a method according to an embodiment of the invention for producing a barb (103). Panel d shows a side view of a barb (103) according to an embodiment of the invention.

In particular, the forming process of the barb (103) is shown in steps in panels a to c. Panel a shows how an arcuate cut (161) is made in a flat element (301), for example a steel or stainless steel sheet. Panels b and c show how a protrusion (171) is formed on one side of the cut (161) by exerting pressure on the flat element (301). The base (181) of the protrusion (171) preferably describes a hemiellipse. Optionally, a flattened top side (140) of the barb may be formed by exerting additional pressure on the top side (141) of the outside (110) of the barb (103), as described in Example 2 (not shown in FIG. 2B).

The process according to panels a to c results in a barb element (501) according to an embodiment of the invention as shown in panel d, comprising a barb (103) and a flat element (301). The barb (103) is formed from a sheet material. The angle or exterior angle α' formed between the flat element (301) and the edge (162) of the barb is smaller than 90°. As a result thereof, the barb will provide a form-fitted connection.

Example 4

Figure 3:
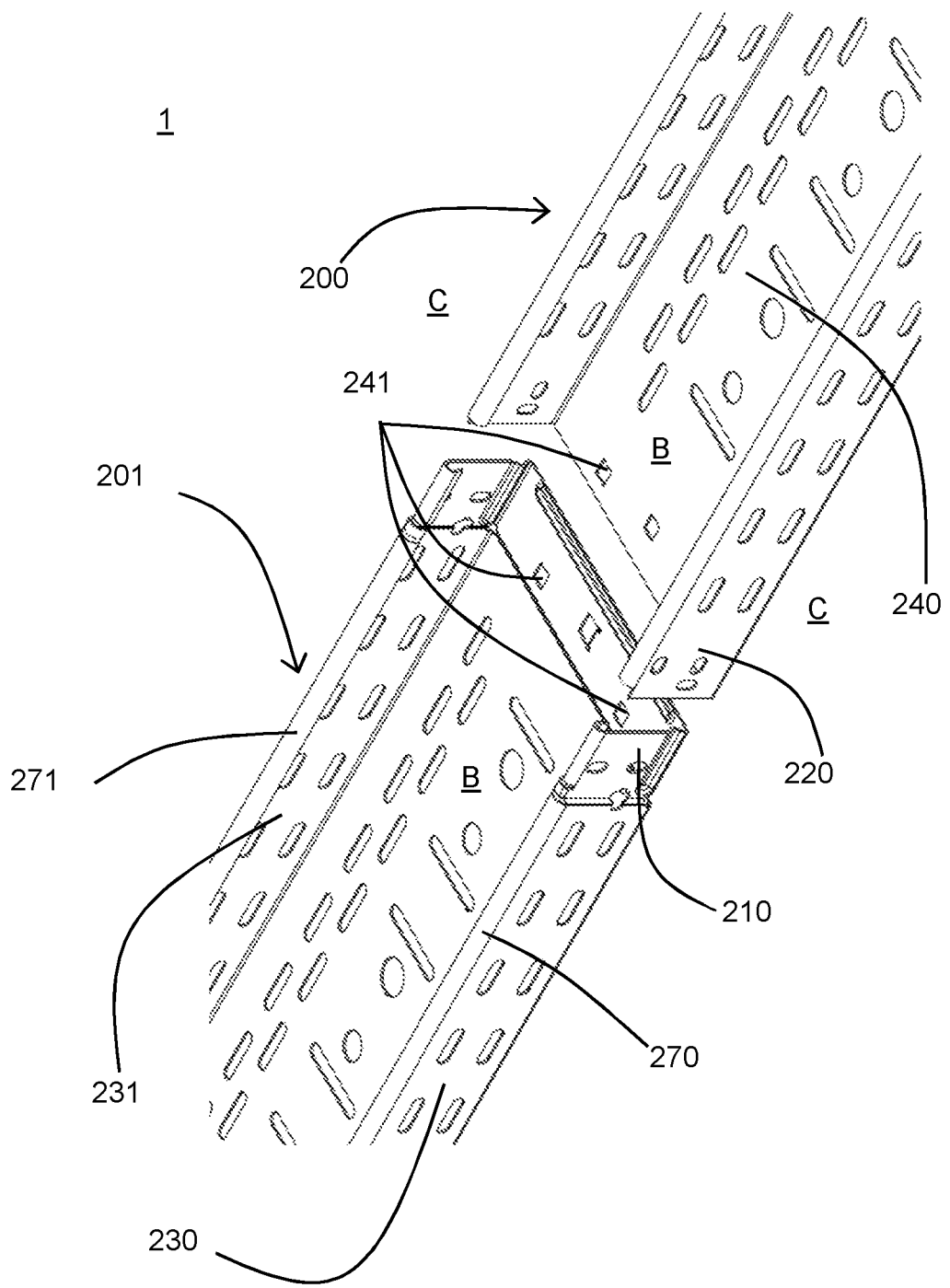
FIG. 3 shows an assembly (1) according to an embodiment of the present invention comprising two cable trays (200,201).
Figure 4:
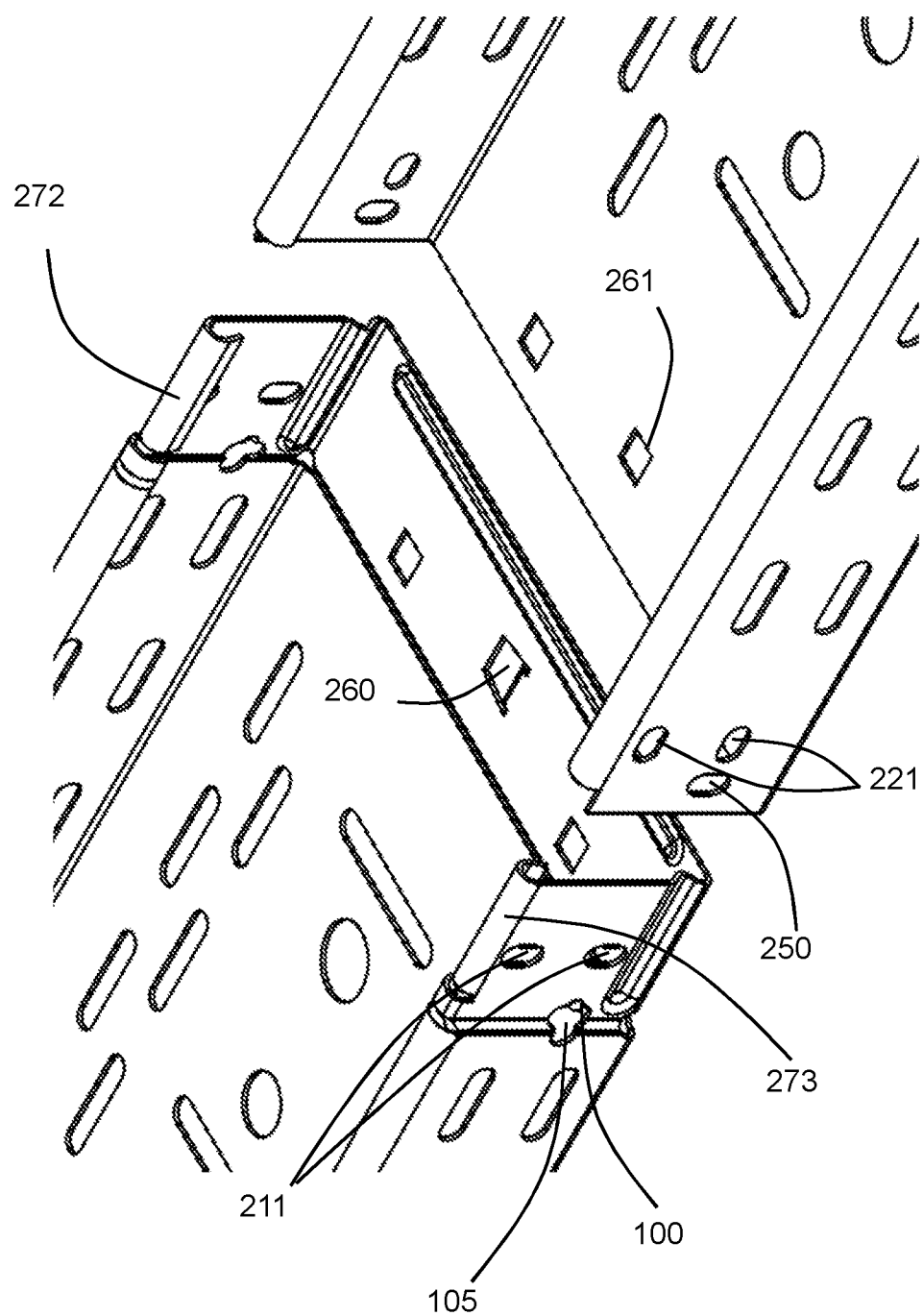
FIG. 4 shows a detail drawing of an assembly (1) according to an embodiment of the present invention comprising two cable trays (200,201).
Figure 5:
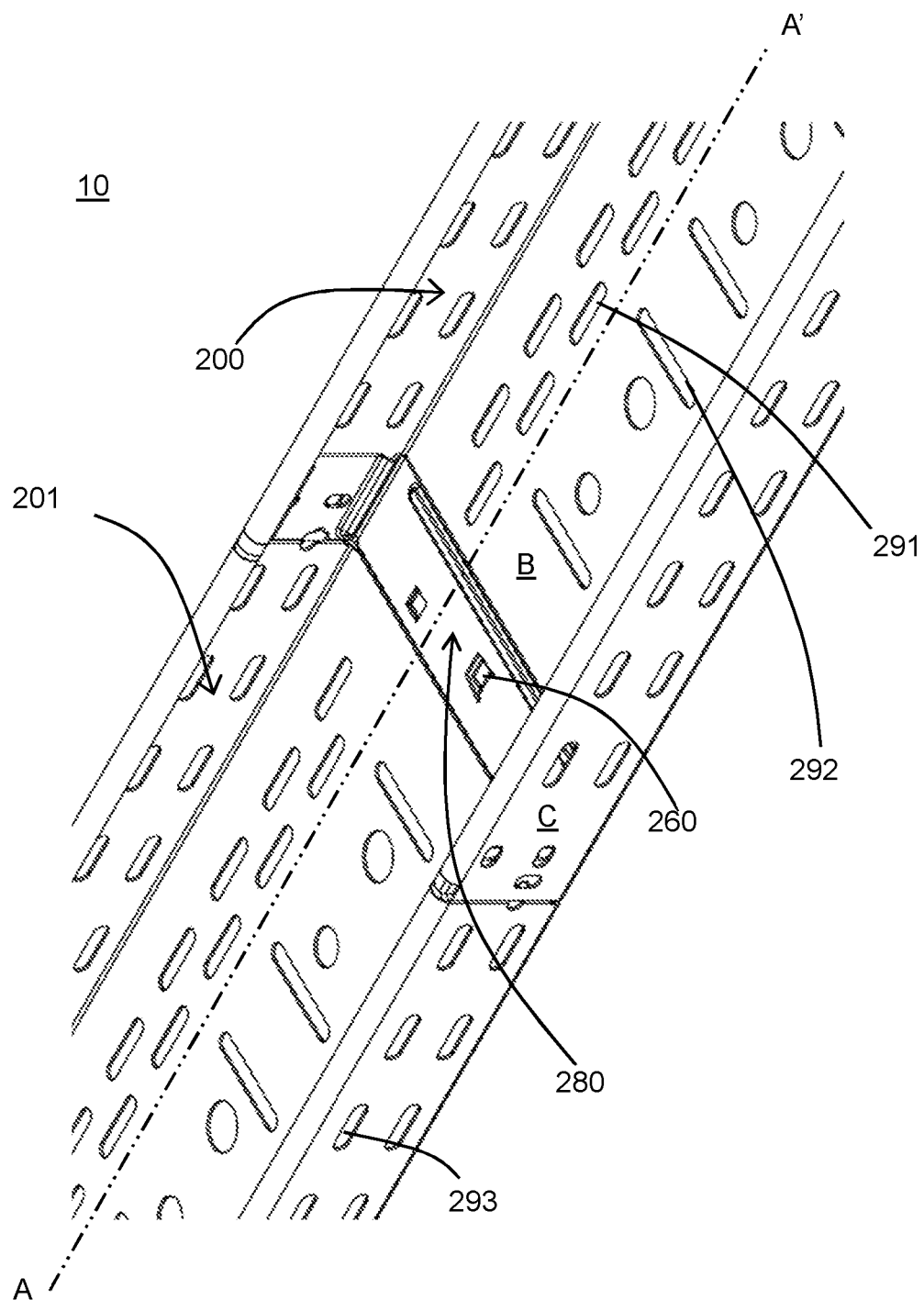
FIG. 5 shows an assembled assembly (10) according to an embodiment of the present invention comprising two cable trays (200,201).
Figure 6:
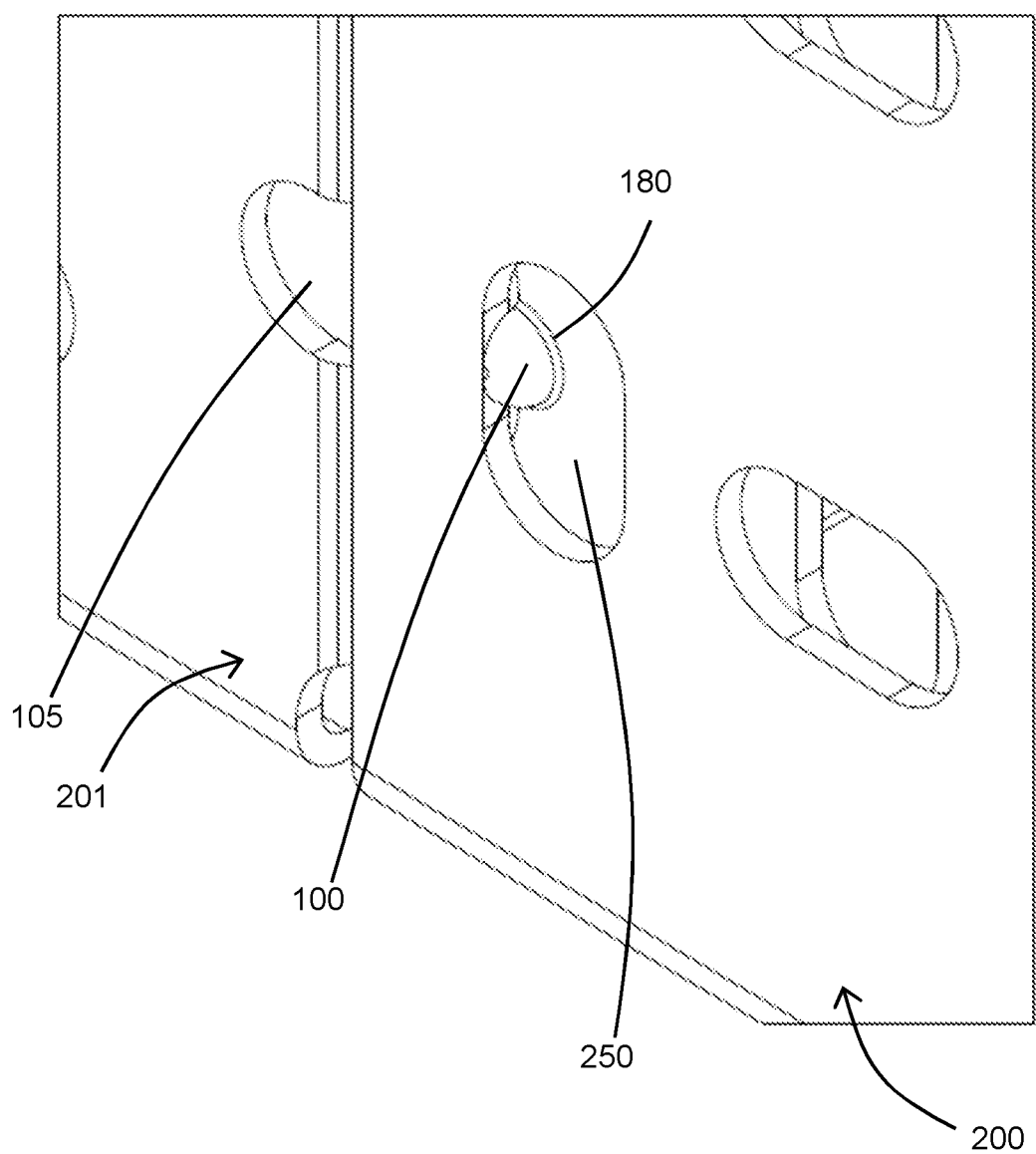
FIG. 6 shows a detail drawing of an assembled assembly (10) according to an embodiment of the present invention comprising two cable trays (200,201).
Figure 7:
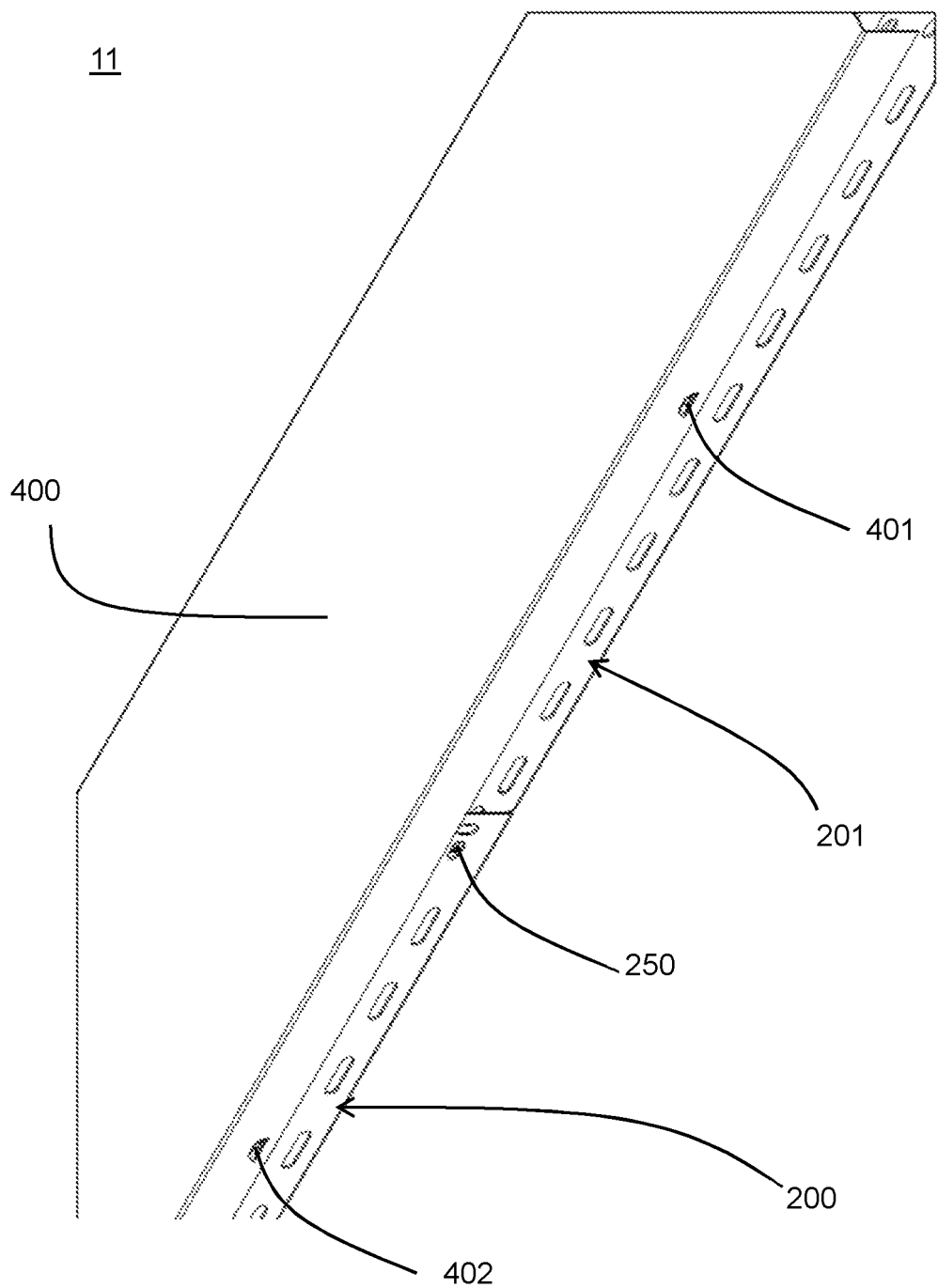
FIG. 7 shows an assembled assembly (11) according to an embodiment of the present invention comprising two cable trays (200,201) and a cover (400).
Figure 8:
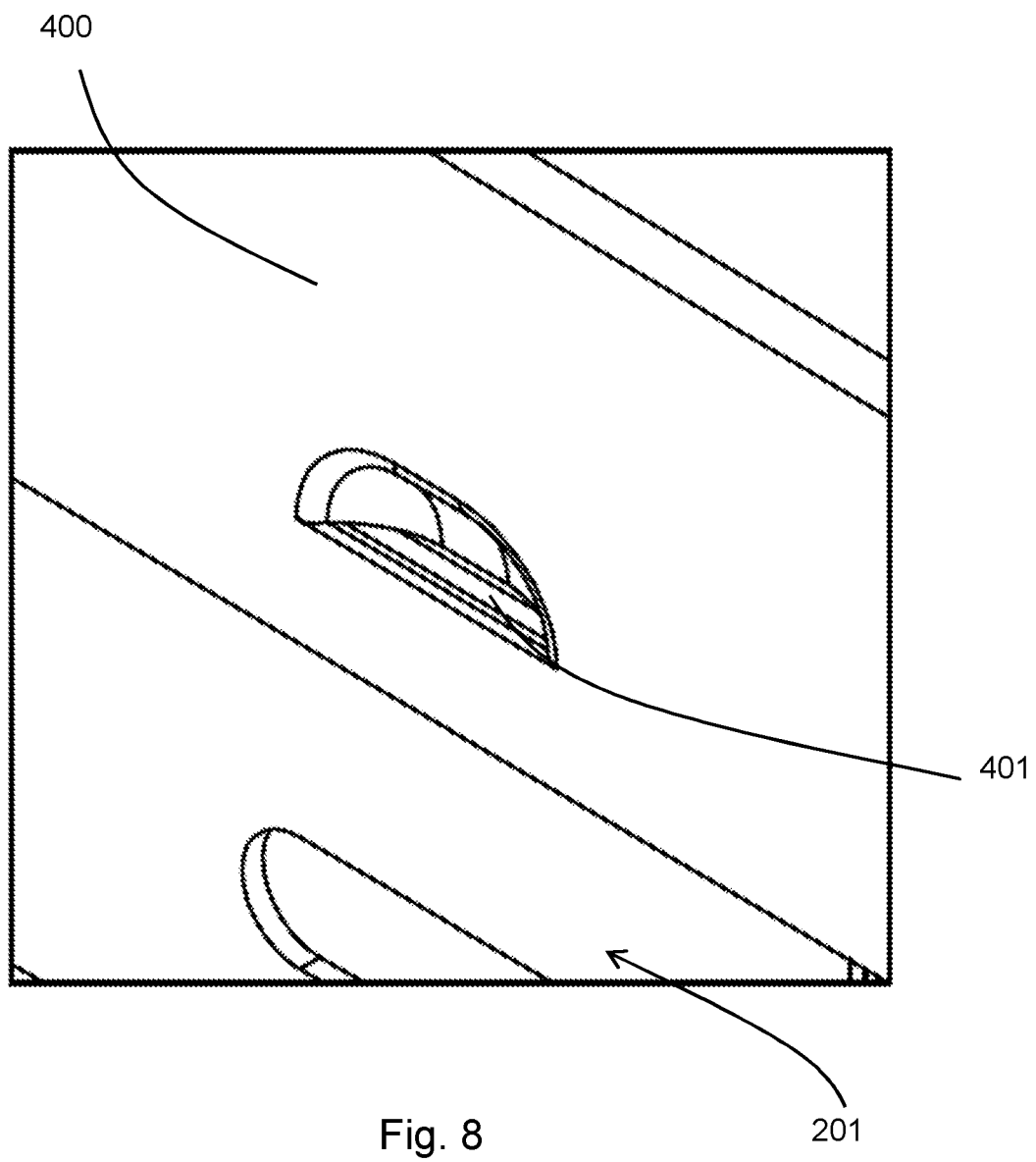
FIG. 8 shows a detail drawing of an assembled assembly (11) according to an embodiment of the present invention comprising two cable trays (200,201) and a cover (400).

In a further example, reference is made to FIG. 3 to FIG. 8. FIG. 3 shows an assembly (1) according to an embodiment of the invention comprising two cable trays (200,201). The cable trays (200,201) each have an inner side (B) and an outer side (C). FIG. 4 is a detail view of FIG. 3. FIG. 5 shows an assembled assembly (10) according to an embodiment of the invention comprising two cable trays (200,201). FIG. 6 shows a detail view of FIG. 5. FIG. 7 shows an assembled assembly (11) according to an embodiment of the present invention comprising two cable trays (200,201) and a cover (400). FIG. 8 shows a detail drawing of an assembled assembly (11) according to an embodiment of the present invention comprising two cable trays (200,201) and a cover (400).

The cable trays (200,201) as shown in FIG. 3 to FIG. 8 have, for example, a width of 150 mm, a height of 60 mm, and a thickness of 1.25 mm.

As is shown in FIG. 3, the cable trays (200,201) comprise a bottom (240) and two upright sides (230,231). The bottom (240) and the two upright sides (230,231) are made in one piece. As an extension of the bottom (240) and the upright sides (230,231), the cable trays (200,201) comprise a first end (210) and a second end (220). The width of the first end (210) is smaller than the width of the second end (220). As indicated in FIG. 4, each side (230,231) of the first end (210) comprises a barb (100). Each side (230,231) of the second end (220) comprises a barb opening (250) into which a barb (100) can be clicked so as to form an assembled assembly (10), as is shown in FIG. 5. In particular, the first end (210) of a cable tray is pushed into the second end (220) of another cable tray in order to form an assembled assembly (10).

The barbs (100) of the first end of the one cable tray (201) are clicked into the barb openings (250) of the second end (220) of the other cable tray (200). The barbs (100) and barb openings (250) offer an in-line produced solution for connecting cable trays to one another with sufficient stability and load-bearing capacity. The first end (210) has a length of 50 mm. The second end (220) has a length of 50 mm. The first end (210) of the one cable tray (201) and the second end (220) of the other cable tray (200) have been slid over one another, thus forming a bearing surface (280). The length of the bearing surface (280) is 50 mm. The bearing surface helps the assembled assembly to achieve a satisfactory load-bearing capacity.

As is shown in FIG. 3, the cable trays (200,201) each comprise an inwardly folded upper longitudinal edge (270, 271) which is open towards the underside. The inwardly folded longitudinal edge (270,271) of the second end (220) of each cable tray (200,201) is provided for slidably receiving the inwardly folded upper longitudinal (272, 273) edge of the first end (210) of another cable tray (200,201).

The width of each cable tray (200,201) is equal to the width of the second end (220) over the entire length, except at the first end (210) where the cable tray is less wide. Also, the cable trays (200,201) are preferably less high at the first end (210): the cable trays (200,201) are of equal height over the entire length, except at the first end (210) where they are less high. In particular, the width of the first end (210) is approximately 2.75 mm (i.e., 2×the sheet thickness of 1.25 mm+0.25 mm) smaller than the width of the second end (220), the height of the first end (210) is approximately 2.75 mm (i.e., 2×the sheet thickness of 1.25 mm+0.25 mm) smaller than the height of the second end (220). Furthermore, the bottom (240) of the first end (210) is preferably also 1.50 mm (i.e., 1×the sheet thickness+0.25 mm) raised with respect to the bottom (240) of the rest of the cable tray (200,201). This facilitates the sliding of the first end (210) and the second end (220) into each other and makes easy assembly possible.

The bottom (240) of the cable trays (200,201) comprises a pre-cut trapezoidal folding flap (260). After the first end (210) and the second end (220) have been clicked together, this folding flap (260) can be pushed through the folding flap opening (261) situated underneath in order thus to ensure an equipotential connection and higher load-bearing capacity of the assembled cable trays (200, 201).

Furthermore, the bottom (240) and the sides (230,231) comprise fitting openings (211,221,241) at the first end (210) and second end (220). The fitting openings (241) in the bottom (240) readily make installation by one person possible. For example, the first end (210) can easily be pushed over the second end (220) by using a flat tool (such as an open-end wrench or open-end spanner). In the first stage of fitting, the fitting openings (241) of the first and second end are positioned in such a way that only a small rectangular opening is created. The barb (100) of the first end (210) now just touches the second end. A simple flat tool can be inserted into the openings (241). By rotating this flat tool, the overlap of the fitting openings will be increased and the two ends will move towards each other, ultimately resulting in the barb (100) engaging with the barb opening (250). By providing several fitting openings, the assembling force can be doubled or increased. Relatively large assembling forces can be produced by another form of overlap, as a result of which even greater thicknesses can still be assembled by one person using a standard tool with a higher torque capacity (for example a ratchet pawl).

The fitting openings (211, 221) in the sides make release by one person possible. For example, during fitting, the first end (210) and the second end (220) can be slid over one another and clicked together, the length of the required part of the cable tray (200) can be marked off, the first end (210) and the second end (220) can be detached again in order to cut off the required piece of the cable tray (200) and the piece of the cable tray (200) with the correct dimensions can subsequently be fitted in a simple manner. Release by one person is ensured by the opening (105) of which the barb forms part. The distance from the barb (100) to the end of the opening (105) of which the barb forms part may be chosen in such a manner that a small open-end wrench can be inserted therein. This is then used as a lever in order to bend the barb opening (250) of the second end so far from the barb for each side that the barb is released and the ends can be disengaged.

Furthermore, the cable trays (200, 201) comprise longitudinal perforations (291) and transverse perforations (292). These perforations make convective cooling and/or condensation discharge possible, as well as the provision of mechanical connections.

FIGS. 7 and 8 show an assembled assembly (11) comprising two cable trays (200,201) and a cover (400). The cover (400) is designed to be clicked onto an assembled assembly (10) of cable trays. The cover (400) comprises releasable clickable connections (401, 402), also referred to as louvre connection. These releasable clickable connections (401, 402) may be clicked onto an assembled assembly (10).

The sides (230, 231) of the cable trays (200,201) comprise longitudinal perforations (293) into which the releasable clickable connections (401, 402) can be clicked.

Example 5

Cable trays according to an embodiment of the present invention were connected by means of the clickable connection and subjected to the IEC 61537 test.

The results of the IEC 61537 test confirm that, in a cable tray having a width of 300 mm and a height of 60 mm, the clickable connection resulted in a comparable Safe Working Load (SWL=88 daN/m) to that of an equivalent tray which had been coupled together using screws (SWL=90 daN/m).

Example 6

Figure 9:
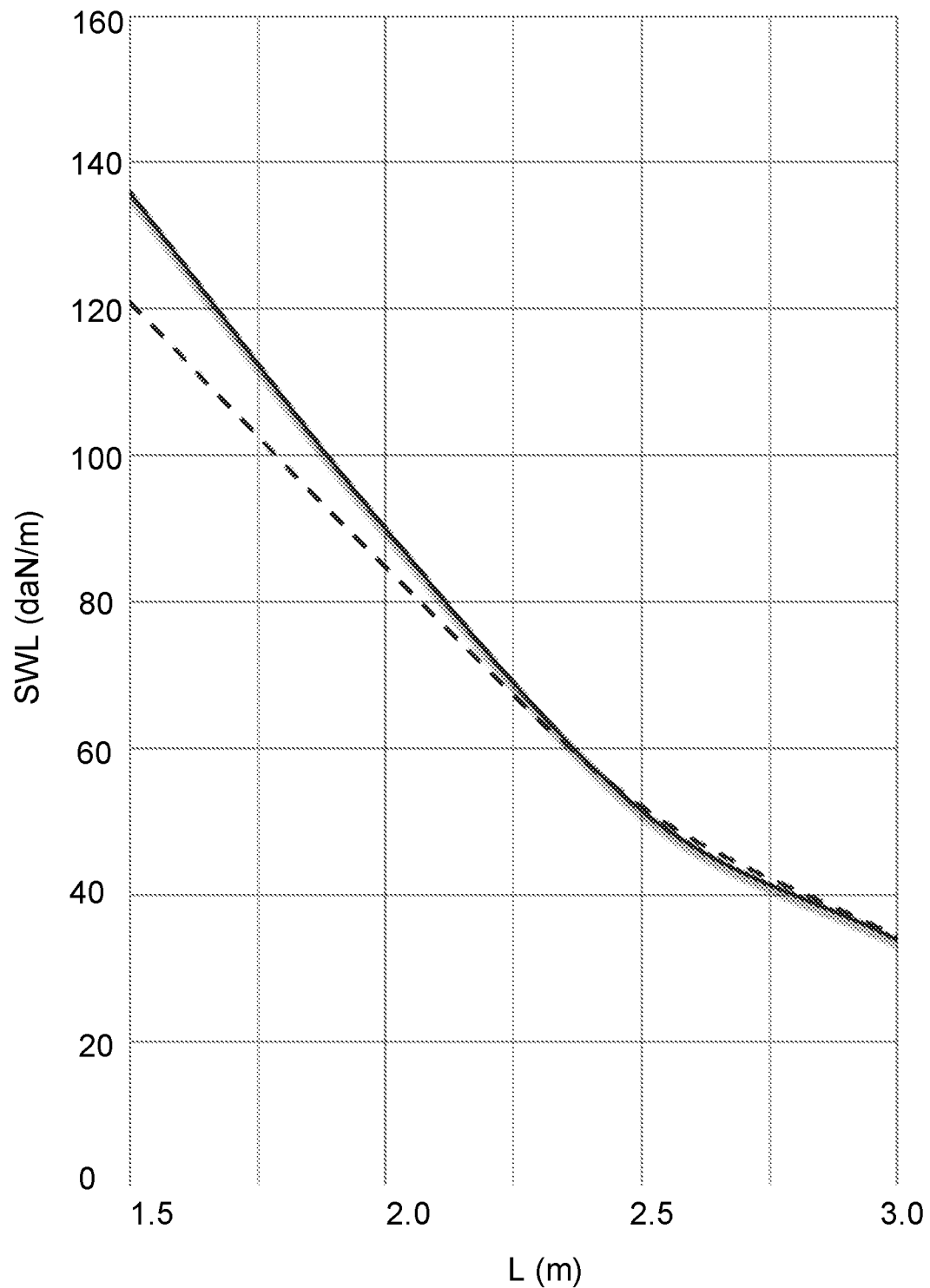
FIG. 9 shows a graph which illustrates the safe working load, SWL, (vertical axis) as a function of the distance which is spanned between two supports, L, (horizontal axis), and this for an assembly of cable trays with clickable connection according to an embodiment of the present invention (solid line), and for an assembly in which adjacent cable trays are attached to one another by means of bolts (dashed line).

The cable trays according to an embodiment of the present invention were further subjected to more comprehensive tests. In particular, according to an embodiment of the present invention, cable trays were connected by means of the clickable connection and subjected to the IEC 61537 test with connection in the center of the supporting distance and end span of 0.8×L. The test results are shown in FIG. 9. FIG. 9 shows in particular the safe working load, SWL, (vertical axis) (or maximum acceptable evenly distributed load) as a function of the distance which is spanned between two supports, L, (horizontal axis), and this for an assembly of cable trays with clickable connection according to an embodiment of the present invention (solid line), and for an assembly in which adjacent cable trays are connected to one another by means of bolts (dashed line). The cable trays according to an embodiment of the invention have one barb in each side of the first end of the cable tray. The cable trays according to the prior art have no barbs, but are connected to each other by means of bolts. Except for the manner in which the adjacent cable trays are connected, both samples are identical.

The results of the IEC 61537 test confirm that, in a cable tray having a width of 300 mm wide and a height of 60 mm, the clickable connection resulted in a similar Safe Working Load as an identical tray which was coupled together with bolts. This is shown in FIG. 9 and in the following table.

| Distance (m) | SWL (daN/m) Reference cable trays | SWL (daN/m) Cable trays according to an embodiment of the invention |
| --- | --- | --- |
| 1.5 | 121 | 136 |
| 2.0 | 85 | 90 |
| 2.5 | 52 | 51 |
| 3.0 | 34 | 34 |

It is surprising that the cable trays featuring a clickable connection with only one barb have a load-bearing capacity on each side which is as good as that of equivalent cable trays which have been coupled together using screws. In addition, the cable tray featuring the clickable connection is easier to produce, simpler to assemble and compatible with all existing current surface treatments, including hot-dip galvanization.

Example 7

Figure 10:
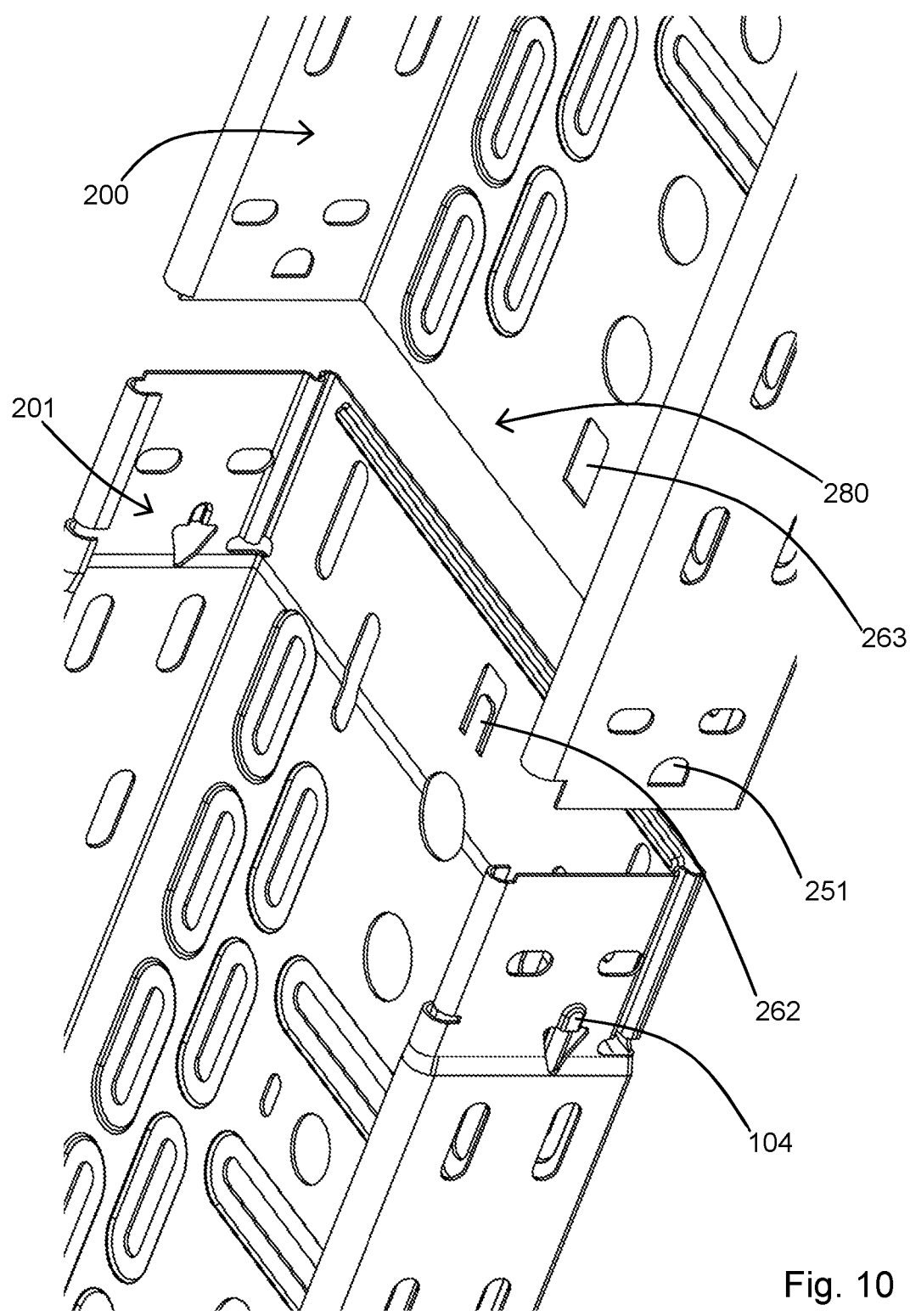
FIG. 10 shows two cable trays (200,201) which have been moved apart, according to an embodiment of the present invention.
Figure 11:
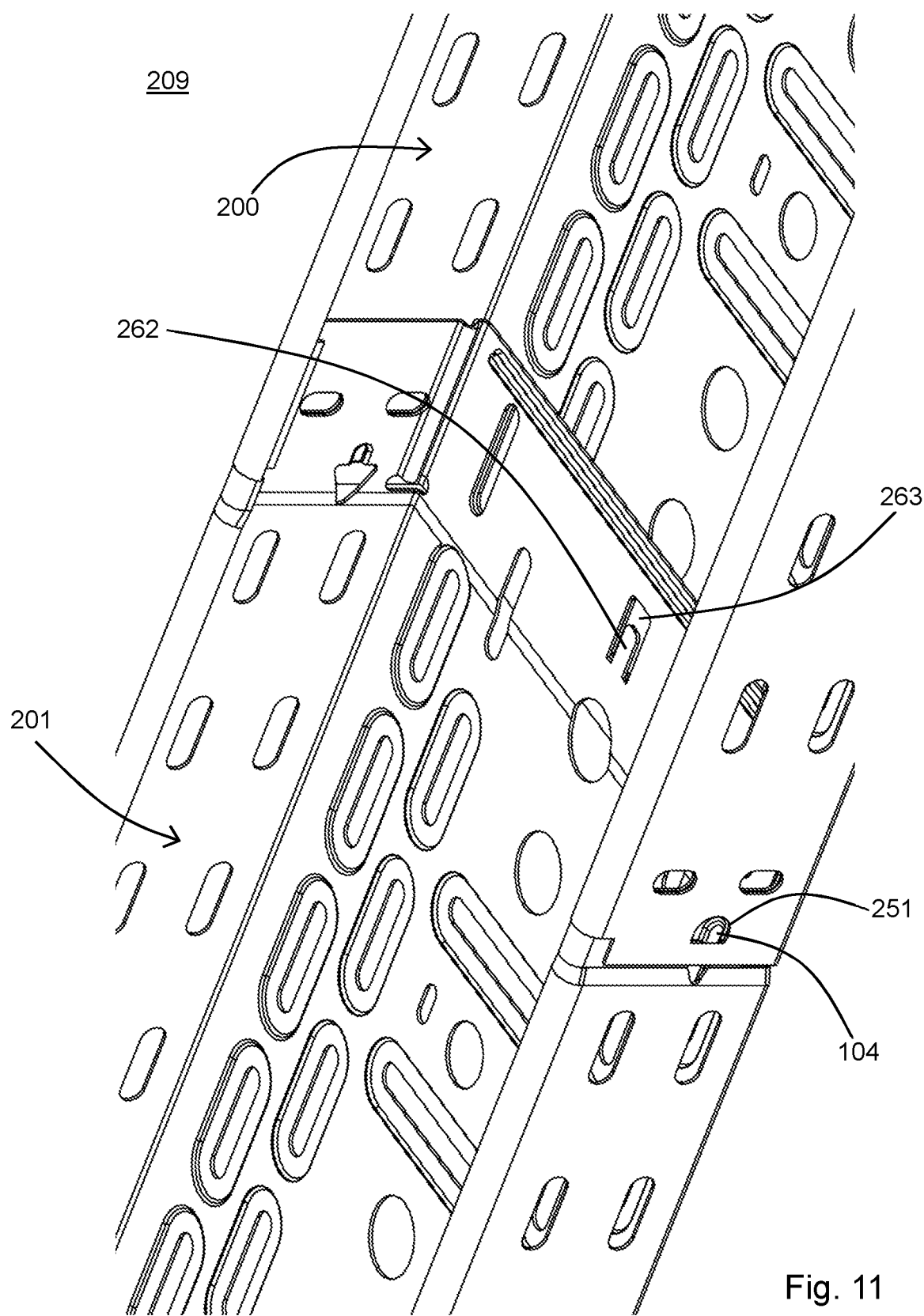
FIG. 11 shows an assembled assembly (209) according to an embodiment of the present invention which comprises two cable trays (200,201) which have been moved one inside the other.

By way of further example, we refer to FIGS. 10 and 11. These figures respectively show two cable trays (200,201) and an assembly (209) as provided herein. In other words, FIG. 10 shows two cable trays (200,201) which have been pushed apart and FIG. 11 shows an assembly (209) according to an embodiment of the invention comprising two cable trays (200,201) which have been pushed inside one another. The cable trays and the assembly are similar to those described in Example 4, except for some differences which are pointed out below. As is also the case in Example 4, each side of the first end comprises a barb (104) and each side of the second end comprises a barb opening (251). However, the barb openings (251) according to the present example are crescent-shaped. In other words, the barb openings have a straight side and an elliptical side. Expressed in yet another way, the barb openings have a shape which corresponds to a part, preferably the smallest part, of an ellipse between the periphery of the ellipse and a line which runs parallel to the short axis of the ellipse. In this way, the forces which act on the barb openings during normal use are distributed much more evenly over the edge of the barb opening, and thus the stresses on the edge of the barb opening are reduced.

In the embodiments according to the present example, the barbs (104) have a shape similar to the barb openings (251), but the barbs (104) are smaller so that they fit into the barb openings (251).

The orientation of the folding flap (262) and the folding flap opening (263) in this embodiment is also different. In particular, the folding flap (262) in this embodiment is aligned with the longitudinal direction of the cable tray. In other words, the folding flap (262) is foldable about an axis which is at right angles to the longitudinal direction of the cable tray.

The invention claimed is:

1. An assembly comprising two or more cable trays, each cable tray comprising:
   a bottom and two upright sides; and
   a first end extending as a continuation of the bottom and the two upright sides and a second end extending as a continuation of the bottom and the two upright sides,
   wherein a width of each cable tray equals a width of the second end over an entire length thereof, except at the first end where the cable tray is less wide;
   wherein each upright side of the first end comprises only one barb extending from an end of an opening and each upright side of the second end comprises only one barb opening,
   wherein each first end and each second end are configured to mate in a sliding manner and to connect in a clickable manner, and
   wherein a portion of the opening of a first cable tray of the two or more cable trays extends beyond, and remains uncovered by, the second end of a second cable tray of the two or more cable trays when the first and second cable trays are connected.

2. The assembly of claim 1, wherein the first end of the first cable tray of said two or more cable trays is configured to overlap with the second end of the second cable tray of said two or more cable trays;
   wherein each second end of the first cable tray is configured to slidably receive the first end of the second cable tray; and
   wherein the barb of the first cable tray is configured to be clicked into the barb opening of the second cable tray.

3. The assembly of claim 2, wherein each of the upright sides comprises an inwardly folded upper longitudinal edge, and wherein the inwardly folded upper longitudinal edge of the second end is provided to slidably receive the inwardly folded upper longitudinal edge of the first end of the second cable tray.

4. The assembly of claim 1, further comprising a cover configured to be clicked on at least one of said two or more cable trays, and wherein the cover comprises one or several releasable clickable connections.

5. The assembly of claim 1, wherein the first end of the first cable tray of said two or more cable trays and the second end of the second cable tray of said two or more cable trays are slid over one another and wherein the barb of the first cable tray is inserted into the barb opening of the second cable tray.

6. A cable tray assembly, comprising:
 a first cable tray and a second cable tray, wherein each of the first and second cable trays includes a bottom and two upright sides, and a first end extending as a continuation of the bottom and the upright sides, and a second end extending as a continuation of the bottom and the upright sides,
 wherein a width of the cable tray is equal to a width of the second end over the entire length, except at the first end where the first end width of the cable tray is less than the width of the second end, and
 wherein each upright side of the first end comprises exactly one barb extending from an end of an opening, and each upright side of the second end comprises exactly one barb opening, and wherein a portion of the opening of the first cable tray extends beyond, and remains uncovered by, the second end of the second cable tray when the first and second cable trays are connected.

7. The cable tray of claim 6, wherein a height of the first end is smaller than a height of the second end.

8. The cable tray of claim 6, wherein a height of each cable tray is equal to a height of the second end over an entire length of the cable tray, except at the first end.

9. The cable tray of claim 6, wherein each of the upright sides comprises an inwardly folded upper longitudinal edge; and/or wherein a portion of the side of the second end comprises an inwardly folded upper longitudinal edge;
 wherein the inwardly folded upper longitudinal edge is open towards an underside; and
 wherein the inwardly folded upper longitudinal edge of the first end is smaller than the inwardly folded upper longitudinal edge of the second end.

10. The cable tray of claim 6, wherein the bottom and the two upright sides are made as a single piece.

11. The cable tray of claim 6, wherein the barb comprises a lip and/or wherein the barb comprises an outer side, an inner side and an end, and the inner side of the barb projects from the barb opening.

12. The cable tray of claim 6, wherein the bottom of the cable tray comprises a pre-cut folding flap, wherein the folding flap is operable to overlap a second end of an adjacent cable tray.

13. A method of making a cable tray assembly, comprising:
 providing a bottom and two upright sides of a first cable tray and a second cable tray, wherein a first end extends as a continuation of the bottom and the upright sides, wherein a second end extends as a continuation of the bottom and the upright sides, and wherein a width of the cable tray is equal to a width of the second end over the entire length, except at the first end where the first end width of the cable tray is less than the width of the second end;
 providing just one barb along each of the upright sides of the first end of the first cable tray, the barb extending from an end of an opening; and
 providing just one barb opening along each of the upright sides at the second end of the second cable tray, wherein a portion of the opening of the first cable tray extends beyond, and remains uncovered by, the second end of the second cable tray when the barb of the first cable tray is inserted through the barb opening of the second cable tray.

14. The method of claim 13, wherein forming the first end is performed using a flying die.

\* \* \* \* \*